(12) United States Patent
Karr

(10) Patent No.: US 9,104,428 B1
(45) Date of Patent: Aug. 11, 2015

(54) WIDE-SPECTRUM TYPE SYSTEM INCORPORATING REPRESENTATION TYPES, CORRECTNESS TYPES, COERCIONS, AND FUNCTION OVERLOAD RESOLUTION

(71) Applicant: The MathWorks, Inc., Natick, MA (US)

(72) Inventor: Michael Karr, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/092,128

(22) Filed: Nov. 27, 2013

Related U.S. Application Data

(62) Division of application No. 13/078,694, filed on Apr. 1, 2011, now Pat. No. 8,627,282.

(60) Provisional application No. 61/320,544, filed on Apr. 2, 2010.

(51) Int. Cl.
*G06F 9/45* (2006.01)

(52) U.S. Cl.
CPC ...................................... *G06F 8/437* (2013.01)

(58) Field of Classification Search
None
See application file for complete search history.

(56) References Cited

U.S. PATENT DOCUMENTS

| | | |
|---|---|---|
| 5,696,974 A | 12/1997 | Agrawal et al. |
| 8,195,712 B1 | 6/2012 | McCormick |
| 2003/0221182 A1 | 11/2003 | Tip et al. |
| 2006/0130021 A1 | 6/2006 | Plum et al. |
| 2008/0034353 A1 | 2/2008 | Rajamani et al. |
| 2008/0282238 A1* | 11/2008 | Meijer et al. .................. 717/162 |
| 2010/0299658 A1 | 11/2010 | Ng et al. |

OTHER PUBLICATIONS

Meyer, "On Types and Type Consistency in Logic Programming," Mar. 2000.*
Henglein, "Polymorphic Type Inference and Semi-Unification," May 1989.
Rowe, "Intersection Types for Class-based Object Oriented Programmin ," Sep. 2008.
Pierce, Types and Programming Languages, MIT Press (Cambridge, MA; London, England), 2002—ISBN: 9780262162098, pp. 206-207.
Reynolds,Theories of Programming Languages Cambridge University Press (U.S. Britain), 2009—ISBN: 9780521106979; pp. 349-358.
Stansifer et al., "Type reconstruction for coercion polymorphism (Technical summary)," Computer Science Technical Reports, 1991.
Smith et al., "Principal Type Schemes for Functional Programs with Overloading and Subtyping," Cornell University, Dec. 1994.

(Continued)

*Primary Examiner* — Insun Kang
(74) *Attorney, Agent, or Firm* — Venable LLP; Michael A. Sartori; Todd R. Farnsworth

(57) ABSTRACT

In an embodiment of the invention, one or more tangible non-transitory computer-readable storage media may store the following instructions. Defining representation type spaces $R_1$ and $R_2$ and correctness type spaces $C_1$ and $C_2$ over the representation type spaces $R_1$ and $R_2$, respectively. Defining a representation type space R and a correctness type space C over the representation type space R, such that a semilattice associated with the correctness type space C is a function semilattice over respective semilattices associated with the correctness type spaces $C_1$ and $C_2$.

14 Claims, 19 Drawing Sheets

(56) References Cited

OTHER PUBLICATIONS

Leuschel et al., "Abstract Conjunctive Partial Deduction using Regular Types and its Application to Model Checking," Springer-Verlag Berlin Heidelberg 2002.

Kaes et al., "Type Inference in the Presence of Overloading, Subtyping and Recursive Types," ACM, 1992.

Shields et al., "Object-Oriented Style Overloading for Haskell," Microsoft, 2001.

Henglein, "Polymorphic Type Inference and Semi-Unification," May, 1989.

Xiong, "An Extensible Type System for Component-Based Design," 2002.

Siek et al., "Gradual Typing with Unification-based Inference," ACM, 2008.

Rowe, "Intersection Types for Class-based Object Oriented Programming," Sep. 2008.

* cited by examiner

```
// Definition common to partially ordered set and quasi-ordered set.
template <class t>
struct OrderedSetWithBottom {                    ←————————1405
    virtual t bottom() = 0;
    virtual bool le(t, t) = 0;
    virtual bool is_bottom(t x) { return le(x, bottom()); }
};

// Parameterized definition of quasi-ordered set.
template <class t>
struct QuasiOrderedSet : virtual OrderedSetWithBottom<t> {  ←————1410
    virtual bool equal(t, t) = 0;
    virtual bool equivalent(t x1, t x2) { return le(x1, x2) && le(x2, x1); }
};

// Parameterized definition of partially ordered set (implicitly, with bottom).
template <class t>                               ←————1415
struct PartiallyOrderedSet : virtual OrderedSetWithBottom<t> {
    virtual bool equal(t x1, t x2) { return le(x1, x2) && le(x2, x1); }
};

// Parameterized definition of semilattice (implicitly, with bottom).
template <class t>                               ←———— 1420
struct Semilattice : virtual PartiallyOrderedSet<t> {
    virtual t glb(t, t) = 0;
};

// A representation type space is a quasi-ordered set, with gamma
template <class t, class f>                      ←———— 1425
struct RepresentationTypeSpace : virtual QuasiOrderedSet<t> {
    virtual f gamma(t t2, t t1) = 0;   // Valid only when le(t1, t2) = true.
};

// A correctness type space adds a semilattice requirement
// to a representation type space, connected by a tau.
template <class T, class t, class f>
struct CorrectnessTypeSpace                      ←———————— 1430
        : virtual RepresentationTypeSpace<t, f>,
          virtual Semilattice<T> {
    virtual T tau(t) = 0;
};
```

FIG. 14A

```
// A generic class for pairs typed by result and argument classes.
template<class f_result, class f_argument>
struct ResultArgumentPair {                              ←——— 1435
    f_result result;
    f_argument argument;
    ResultArgumentPair(f_result result_, f_argument argument_)
        : result(result_), argument(argument_) {}
};

// Function representation types from representation types for results and arguments.
template<class t_result, class t_argument>
struct RepresentationParameterFunction {                 ←——— 1440
    size_t length;
    ResultArgumentPair<t_result, t_argument> *v;
    RepresentationParameterFunction(
        size_t length_, ResultArgumentPair<t_result, t_argument> *v_)
        : length(length_), v(v_) {}
};

// The definition of the bottom of a quasi-ordered set for functions.
template<class t_result, class t_argument>               ←——— 1445
RepresentationParameterFunction<t_result, t_argument> BottomFunction() {
    RepresentationParameterFunction<t_result, t_argument> bottom(0, 0);
    return bottom;
}

// This is the class that defines le for the
// quasi-ordered set of function representation types.
template<class t_result, class t_argument>
struct OrderedSetWithBottomFunction                      ←——— 1450
        : virtual OrderedSetWithBottom<
            RepresentationParameterFunction<t_result, t_argument> > {
    OrderedSetWithBottom<t_result>&  R;
    OrderedSetWithBottom<t_argument>& A;
    typedef RepresentationParameterFunction<t_result, t_argument> t;
    t bottom();
    bool le(t, t);
    OrderedSetWithBottomFunction(
        OrderedSetWithBottom<t_result>& R_,
        OrderedSetWithBottom<t_argument>& A_)
        : R(R_), A(A_) {}
};
```

FIG. 14B

```
// This class completes the definition of the quasi-ordered
// set of function representation types, by defining equality.
template<class t_result, class t_argument>                    ←——— 1455
struct QuasiOrderedSetFunction
      : virtual QuasiOrderedSet<RepresentationParameterFunction<t_result, t_argument> >,
        virtual OrderedSetWithBottomFunction<t_result, t_argument> {
   typedef RepresentationParameterFunction<t_result, t_argument> t;
   bool equal(t, t);
   QuasiOrderedSetFunction(
     QuasiOrderedSet<t_result>& R,
     QuasiOrderedSet<t_argument>& A)
     : OrderedSetWithBottomFunction<t_result, t_argument>(R, A) {}
};

// This defines gamma (coercion) for function representation types.
template<class t_result,  class f_result,                      ←——— 1460
       class t_argument, class f_argument>
struct RepresentationTypeSpaceFunction
      : virtual RepresentationTypeSpace<
         RepresentationParameterFunction<t_result, t_argument>,
         RepresentationParameterFunction<f_result, f_argument> >,
         QuasiOrderedSetFunction<t_result, t_argument> {
   RepresentationTypeSpace<t_result,  f_result>& R;
   RepresentationTypeSpace<t_argument, f_argument>& A;
   typedef RepresentationParameterFunction<t_result, t_argument> t;
   typedef RepresentationParameterFunction<f_result, f_argument> f;
   f gamma(t, t);
     RepresentationTypeSpaceFunction(
     RepresentationTypeSpace<t_result,  f_result>&  R_,
     RepresentationTypeSpace<t_argument, f_argument>& A_)
     : QuasiOrderedSetFunction<t_result, t_argument>(R_, A_),
       OrderedSetWithBottomFunction<t_result, t_argument>(R_, A_),
       R(R_), A(A_) {}
};
```

FIG. 14C

```
// Function semilattice from a result and argument semilattices.
template <class result, class argument>                          ← 1465
struct CorrectnessParameterFunction {
  result res;
  argument arg;
  CorrectnessParameterFunction<result, argument> *next; };

template<class T_result, class T_argument>                       ← 1470
struct SemilatticeFunction
    : virtual Semilattice<CorrectnessParameterFunction<T_result, T_argument>*> {
  Semilattice<T_result>& R;
  Semilattice<T_argument>& A;
  typedef CorrectnessParameterFunction<T_result, T_argument> *T;
  T bottom();
  bool le(T, T);
  T glb(T, T);
  SemilatticeFunction(Semilattice<T_result>& R_, Semilattice<T_argument>& A_)
    : R(R_), A(A_) {} };

// Correctness types for functions (defines tau).
template<class T_result,  class t_result,  class f_result,       ← 1475
      class T_argument, class t_argument, class f_argument>
struct CorrectnessTypeSpaceFunction
    : CorrectnessTypeSpace<
      CorrectnessParameterFunction<T_result, T_argument>*,
      RepresentationParameterFunction<t_result, t_argument>,
      RepresentationParameterFunction<f_result, f_argument> >,
      RepresentationTypeSpaceFunction<
      t_result, f_result, t_argument, f_argument>,
      SemilatticeFunction<T_result, T_argument> {
  CorrectnessTypeSpace<T_result,  t_result,  f_result>& R;
  CorrectnessTypeSpace<T_argument, t_argument, f_argument>& A;
  typedef CorrectnessParameterFunction<T_result, T_argument>* T;
  typedef RepresentationParameterFunction<t_result, t_argument> t;
  T tau(t);
  CorrectnessTypeSpaceFunction(
    CorrectnessTypeSpace<T_result,  t_result,  f_result>& R_,
    CorrectnessTypeSpace<T_argument, t_argument, f_argument>& A_)
    : OrderedSetWithBottomFunction<t_result, t_argument>(R_, A_),
      RepresentationTypeSpaceFunction<
      t_result, f_result, t_argument, f_argument>(R_, A_),
      SemilatticeFunction<T_result, T_argument>(R_, A_),
      R(R_), A(A_) {} };
```

FIG. 14D

WIDE-SPECTRUM TYPE SYSTEM INCORPORATING REPRESENTATION TYPES, CORRECTNESS TYPES, COERCIONS, AND FUNCTION OVERLOAD RESOLUTION

RELATED APPLICATIONS

This patent application is a divisional of U.S. patent application Ser. No. 13/078,694, filed Apr. 1, 2011, now issued as U.S. Pat. No. 8,627,282, granted Jan. 7, 2014, which claims the benefit of U.S. Provisional Application No. 61/320,544, filed Apr. 2, 2010. U.S. patent application Ser. No. 13/078,694 and U.S. Provisional Application No. 61/320,544 are hereby incorporated by reference in their entirety.

BACKGROUND

Many computer programming languages have a notion of type. The precise meaning of this notion differs from language to language, but in most cases, types are involved in at least two related aspects of the language:

Types describe the representation of values. For example, the type char might describe an 8-bit value, while double might describe a 64-bit value.

Types are used to resolve overloads of at least some functions. For example, + of two 32-bit integer values behaves differently from + of two 32-bit floating point values.

In some programming languages, often called statically typed languages, types may play an additional role of providing certain correctness guarantees: the computer programming language processing system may reject certain programs as not type-correct. Other programming languages are said to be dynamically typed. A few languages offer both a statically and a dynamically typed aspect.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIGS. 14A, 14B, 14C, and 14D illustrate example software class definitions that may be configured to practice an illustrative embodiment of the invention

DETAILED DESCRIPTION

Overview

One embodiment of the invention may relate to a particular type system called a wide-spectrum type system, suitable for a computer programming language that offers both statically and dynamically typed aspects. There exists an extensive literature on this subject, including *Theories of Programming Languages* by John C. Reynolds, published 1998 and 2009, which may provide the prerequisites for the material discussed here.

A fundamental property of a type is that it may describe, in one way or another, a set of values. Throughout this document a type t has an associated set of values $V_t$. The set $V_t$ may be infinite, but in any given computation, only a finite subset of $V_t$ is used. Some type systems may introduce a notion of a subtype, a relation on types that may say something about the relationship of the associated sets of values. For example, if $t_1$ is a subtype of $t_2$, then $V_{t_1}$ is a subset of $V_{t_2}$. Another definition of subtype may state, for example, that if $t_1$ is a subtype of $t_2$, then the programming language supplies a coercion from $t_1$ to $t_2$. A coercion may be implicitly introduced by the programming language implementation when, for example, a variable has a value of type $t_1$ but a value of type $t_2$ is needed. For example, in the C programming language the type single may be said to be a subtype of the type double. If x has type single and the function f takes one argument of type double, then the construct f(x) is type-correct, and an implementation of the C language automatically supplies an application of the coercion function that takes an argument of type single and produces a result of type double. If $t_1$ is a subtype of $t_2$, for example, this document will use the notation $\gamma_{t_2,t_1}$ to denote the coercion function from $t_1$ to $t_2$. Thus, the C programming language has a rule that for the above f and x, the construct f(x) is equivalent to the construct $f(\gamma_{double, single}(x))$.

Example Programming Environment

Figure 1:
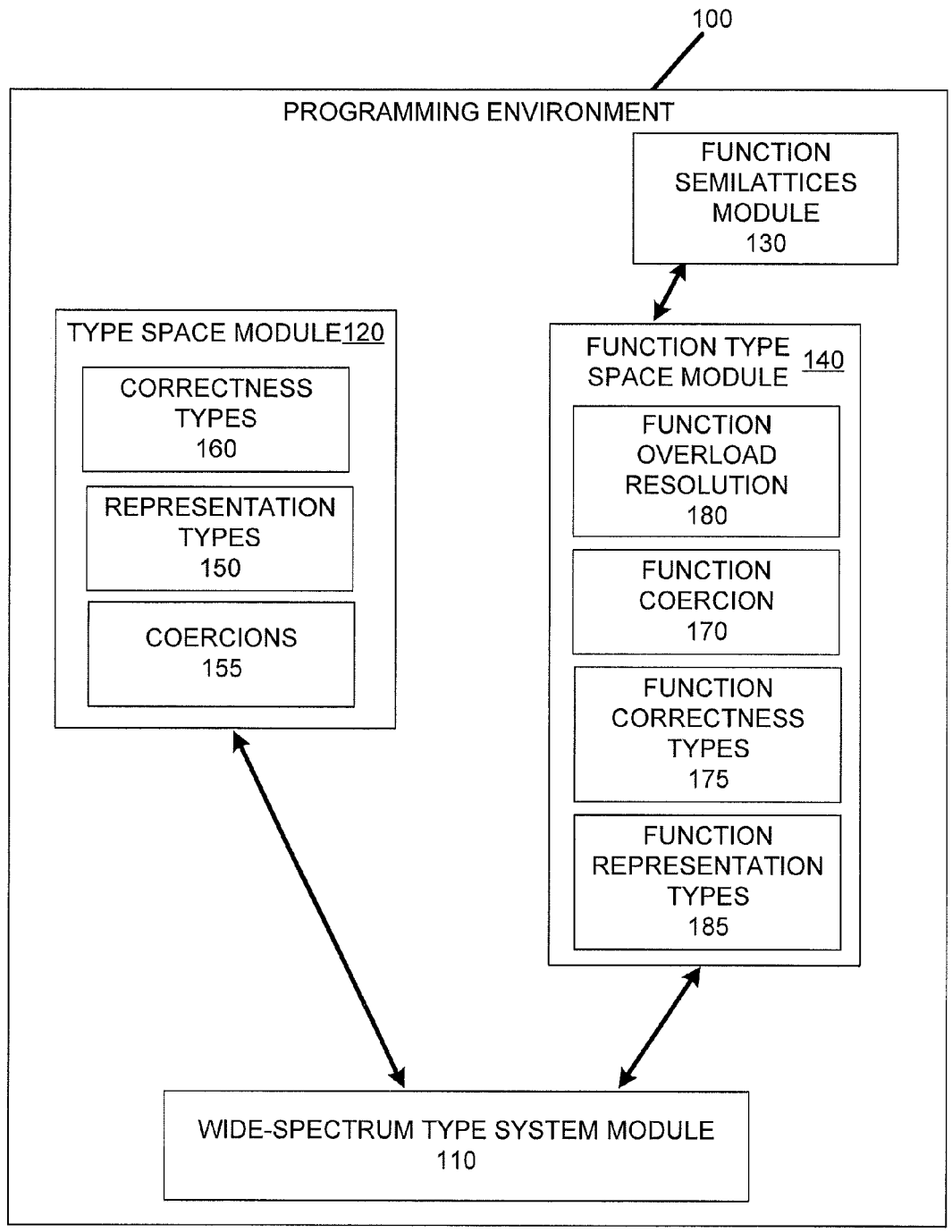
FIG. 1 illustrates an example programming environment in an illustrative embodiment.

FIG. 1 illustrates an example programming environment 100 in an illustrative embodiment. The programming environment 100 may include wide-spectrum type system module 110, type space module 120, function semilattices module 130, and function type space module 140.

Type space module 120 may include both representation types 150, correctness types 160, and coercions 155. Representation types 150 may correspond most closely to the traditional meaning of "type," because they correspond to the representation of values.

A single element of the set of correctness types 160 may correspond to many elements of the set of representation types 150. A correctness type 160 may serve to unify different representations of the same underlying data semantics.

Coercions 155 may correspond to the traditional meaning of the term, referring to a function g implicitly applied to the argument of a function f, before calling f. For example, the language semantics may say that for certain f and x, f(x) means f(g(x)).

Function semilattices module 130 may correspond to predicates on function values. Function values form the basis of function types, and function values may also be used in the absence of types to analyze function behavior.

Function type space module 140 may provide the fundamental operations on function representation types. Function type space module 140 may include function overload resolution 180, function coercion 170, function correctness types 175, and function representation types 185.

Function overload resolution 180 may provide the technique that decides not only which overload to call for a particular application of an overloaded function, but also the application of coercions 155 that align the arguments of the call to those expected by the chosen overload.

Function coercion 170 may refer to the coercion technique applied specifically to function values.

Function representation types 185 may refer to a set of representation types 150, each of whose elements is a representation type for a function represented as a list of overloads.

Function correctness types 175 may refer to a set of correctness types 160, each of whose elements corresponds to a set of mutually coercible function representation types.

The wide-spectrum type system 110 may combine representation types 150, correctness types 160, and coercions 155 aspects and the operations on function representation types 185. Operations on function representation types 185 may include function overload resolution 180 and function type coercion 170, and function correctness types 175. Function correctness types 175 may include operators of function semilattices 130.

Figure 2:
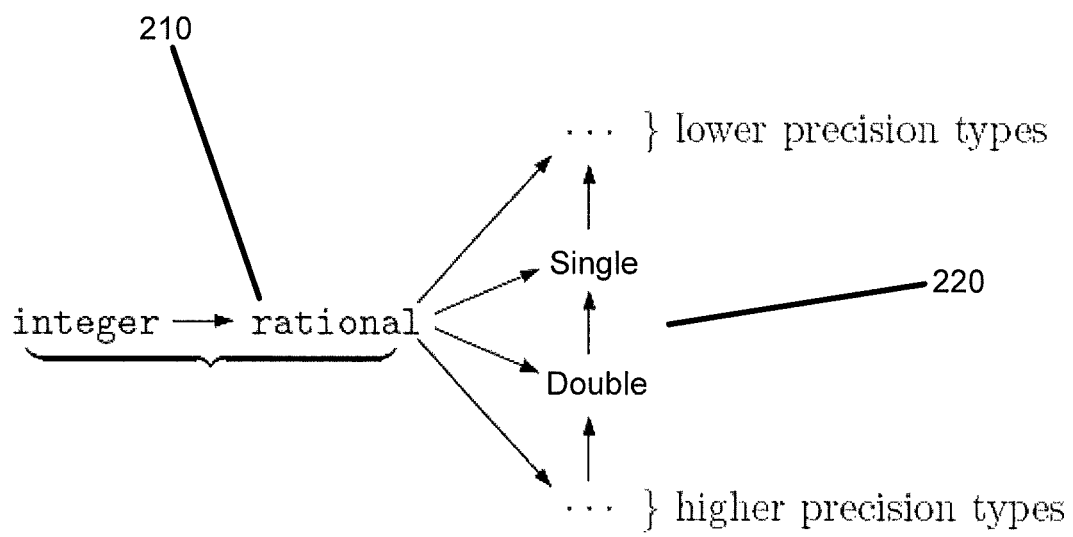
FIG. 2 illustrates example numerical types connected by coercion relationships in an illustrative embodiment.

FIG. 2 illustrates example numerical types connected by coercions 155 relationships 210, 220 in an illustrative embodiment. The coercions 155, for example, integer to rational 210 and double to single 220 are shown. Other coercions 155 of numerical types of higher and lower precision may also be similarly expressed. The direction of coercions 155 may follow, for example, the rule in the MATLAB® computer program from MathWorks, Inc., which coerces higher precision types to lower precision types. Reversing the direction of the vertical arcs, for example, may give the rule from the C programming language that coerces a lower precision type (single) to a higher precision type (double). In an embodiment of the invention, coercions 155 may be handled at the system level and not necessarily by particular choices of coercions or of particular types.

Figure 3:
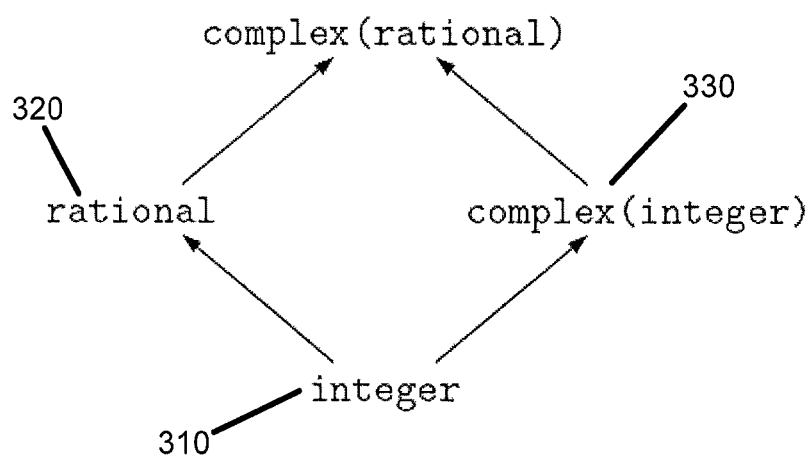
FIG. 3 illustrates example coercions between real numerical types and complex numerical counterparts in an illustrative embodiment.

FIG. 3 illustrates example coercions 155 between real types and complex counterparts in an illustrative embodiment. As shown in FIG. 3, an integer 310 may be coerced to either a value of type rational 320 or complex 330. For example, any type t where complex(t) is valid, there may be a coercion taking a value x of type t to $x+0\sqrt{-1}$, a value of type complex(t). Thus, a real number may be considered to be a complex number, via another example of a coercion.

In one embodiment, a type denoted NEVER, about which the key fact is $V_{NEVER}=\emptyset$, (i.e., there are no values of this type) may be considered as the only type with an empty set of values. Thus, there is a coercion from NEVER to any type t, namely the map with an empty domain. But, this map may rarely be used because functions usually do not have NEVER as an argument type, as that results in never calling the function. On the other hand, a function may often have NEVER as a result type, because in practice, an implemented function may never return. For example, the function may loop forever, it may throw control to an outer point such as an error function, etc.

Figure 4:
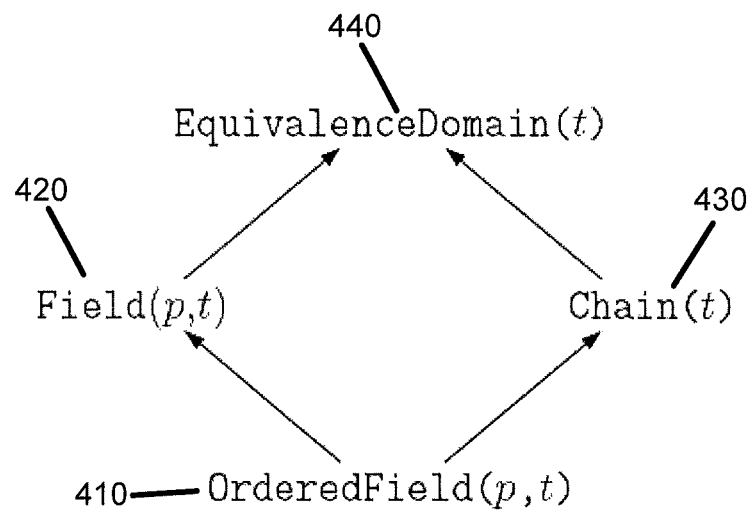
FIG. 4 illustrates example coercions between algebraic objects in an illustrative embodiment.

FIG. 4 illustrates example coercions 155 between some algebraic objects in an illustrative embodiment. FIG. 4 illustrates coercions 155 between types that in many languages may be called classes. Classes may be considered at a higher level than types of values. In this case, coerces-to corresponds to what an object-oriented language may call inherits from. FIG. 4 depicts the following objects OrderedField(p, t) 410, Field(p, t) 420, Chain (t) 430, and EquivalenceDomain(t) 440. OrderedField(p, t) 410 may be a type constructor corresponding to the mathematical definition of an ordered field.

OrderedField(p, t) 410 may take two parameters, namely a precision value (e.g., exact, approximate, etc) and a type (e.g., rational, single, double, etc.)

Field(p, t) 420 may be a type constructor corresponding to the mathematical notion of a field. Field(p, t) 420 may take the same parameters as OrderedField(p, t) 410. Mathematically, any ordered field may also be a field.

Chain (t) 430 may be a type constructor corresponding to the mathematical definition of a set X and a relation < that is a total ordering on X. Chain (t) 430 may take only a single parameter, namely a type.

EquivalenceDomain(t) 440 may be a type constructor corresponding to the mathematical definition of an equivalence relation E on a set X when for all x, y, z ∈ X, E has reflexivity (e.g., x E x), symmetry (e.g., x E y if and only if y E x) and transitivity (e.g., if x E y and y E z, then x E z). EquivalenceDomain(t) 440 may take a single parameter, namely a type.

EquivalenceDomain(t) 440 may be a base class to Field(p, t) 420 and Chain (t) 430. In other words, Field(p, t) 420 and Chain (t) 430 may be derived (e.g., subclasses) from EquivalenceDomain(t) 440. Further, OrderedField(p, t) 410 may be derived from both Field(p, t) 420 and Chain (t) 430.

OrderedField(p, t) 410 may be coerced to Field(p, t) 420 and/or Chain (t) 430. Field(p, t) 420 or Chain (t) 430 may be coerced to EquivalenceDomain(t) 440.

The types or classes are specific examples only and an embodiment of the invention may be implemented at a lower level or higher level (e.g., system) than individual classes. The notion that $t_1$ can be used as $t_2$ may be analogous to the concept of inheritance used in object-oriented languages. For example, if a function has class $t_2$ as the type of a formal parameter, and if $t_1$ inherits from $t_2$, then an actual value of class $t_1$ may be supplied as an actual parameter to the function.

Illustrative Embodiments

In an embodiment of the invention, programming environment 100 may distinguish between representation types 150 and correctness types 160. There may be a set of representation types 150. A set of representation types may be defined by the above-mentioned property that each of its elements describes a set of values. There is a relation on representation types 150 that amounts to the subtype relation, in that it may govern coercions 155. For example, given types $t_1$ and $t_2$, the relation may be denoted by $t_1 \le t_2$, and the relation may be called coerces-to to emphasize that it may be cyclic (e.g., the sub in subtype may connote acyclicity). For technical convenience, it may be stated that NEVER≤t for any representation type 150 t. Observe that this is consistent with the earlier remark that there is a coercion from NEVER to t. It may be possible for distinct types $t_1$ and $t_2$ to satisfy $t_1 \le t_2$ and $t_2 \le t_1$. This condition may be denoted by $t_1 \approx t_2$, and $t_1$ and $t_2$ may be referred to as equivalent, reflecting the fact that $\approx$ is indeed an equivalence relation. If $t_1 \approx t_2$, then the coercion may be inverses of one another (i.e., the composition of $\gamma_{t_1,t_2}$ and $\gamma_{t_2,t_1}$, denoted $\gamma_{t_1,t_2} \circ \gamma_{t_2,t_1}$, may be the identity on $V_{t_1}$ and $\gamma_{t_2,t_1} \circ \gamma_{t_1,t_2}$ may be the identity on $V_{t_2}$). In other words, in a sequence of coercions 155 on types $t_1 \le t_2 \le \ldots \le t_k$, where $t_k = t_1$, called a cycle of coercions, each coercion may be a non-information-losing change of representation.

The behavior of coercions 155 on cycles may be a special case of a more general rule about the coerces-to relation and its interaction with coercions 155. It may be required that coerces-to be a quasi-ordering, meaning that, for example, (a) for any type t, $t \le t$ (reflexivity) and (b) for types $t_1$, $t_2$, and $t_3$, if $t_1 \le t_2$ and $t_2 \le t_3$, then $t_2 \le t_3$ (transitivity). The corresponding rules for function coercion 170 may be (a) for any type t, $\gamma_{t,t}$ is the identity function on $V_t$ (a technical convenience), and (b) for types $t_1$, $t_2$, and $t_3$, if $t_1 \le t_2$ and $t_2 \le t_3$, then $\gamma_{t_3,t_2} \circ \gamma_{t_2,t_1} = \gamma_{t_3,t_1}$ (the composition rule).

A representation type space, by definition, is a triple R, $\le$, $\gamma$ where R is a set of representation types 150, $\le$ is a quasi-ordering of R, and $\gamma$ is a function that maps a pair of types $t_1$, $t_2$, where $t_1 \le t_2$, to a function which we have called a coercion and denoted $\gamma_{t_2,t_1}$, which maps values of type $t_1$ to values of $t_2$.

The coerces-to relation on types may be visualized as a graph, one that is potentially cyclic. By standard graph theory, the strongly connected components of this graph partition the types into equivalence classes over $\approx$, and by the above remarks, any pair of types in the same equivalence class are mutually coercible. This permits a precise characterization of correctness types 160. For example, let R, $\le$, $\gamma$ be a representation type space, and let R/$\approx$ denote the set of equivalence classes of $\approx$. To say that C, $\tau$ is a correctness type space over R, $\le$, $\gamma$ means, by definition, that $\tau$ is a map from R onto C such that $\tau t_1 = \tau t_2$ if and only if $t_1 \approx t_2$. Thus, there is a 1-1 correspondence between T/$\approx$ and T.

This innovative distinction between relatedness of representation types 150 and correctness types 160 may serve the purposes both of the dynamically typed aspects of a language (when representation may be all that matters) and statically typed aspects (because absence of type faults may depend only on correctness types 160).

Correctness Types

The partitioning of a graph into strongly connected components induces a relation on the components. For example, imagine drawing an arc from one strongly connected component to a second if there is an arc from any element of the first strongly connected component to any element of the second. The resulting graph on strongly connected components is acyclic. This graph-theoretic fact may say the following with regard to correctness types 160: for example, denoting the element-of relation by $\in$, let $t_i$, $t_2 \in T$ be any elements satisfying $t_i \le t_2$; then there may be an arc from the strongly connected component to which $t_1$ belongs to the strongly connected component to which $t_2$ belongs. Because elements of T are in 1-1 correspondence with the strongly connected components, an arc may exist from $\tau t_1$ to $\tau t_2$, a relation that may be written with a different symbol, still suggestive of ordering: $\tau t_1 \sqsubseteq \tau t_2$; briefly, this relation on T may be defined by the rule that for $T_1, T_2 \in T$, $T_1 \sqsubseteq T_2$ holds if and only if there exists $t_1$, $t_2 \in T$ such that $t_1 \le t_2$ and $\tau t_i = T_i$ for i=1 and 2. Applying this rule to NEVER, the fact that NEVER$\le$t for all $t \in T$ means that $\tau(\text{NEVER}) \sqsubseteq \tau t$. Denotation of $\tau(\text{NEVER})$ may be by $\bot$, referred to as bottom. Since for every $T \in T$ there may be some $t \in T$ with $\tau t = T$, it follows that $\bot \sqsubseteq T$ for every $T \in T$.

To understand intuitively what $\sqsubseteq$ means, suppose that a variable x has correctness type 160 $T_1$ and that the argument of f has correctness type 160 $T_2$, with $T_1 \sqsubseteq T_2$. Then, without knowing the representation type 150 of x or of the argument of f, one may still conclude that the construct f(x) is type-correct. The reasoning is as follows. From $T_1 \sqsubseteq T_2$, we know that there exists $t_1, t_2 \in T$ such that $t_1 \le t_2$ and $\tau t_i = T_i$ for i=1 and 2. For example, let the representation type 150 of x be $t'_1 \in T$, so $\tau t'_1 = \tau t_1$. By the definition of correctness types 160, $t'_1 \approx t_1$, and by the definition of it follows that $t'_1 \le t_1$. Similarly, let the representation type 150 of the argument of f be $t'_2 \in T$, for example. Then $t_2 \le t'_2$, with the same reasoning as before. Since $t_1 \le t_2$, transitivity says that $t'_1 \le t'_2$. Thus f(x) is type-correct, since x may be coerced to the type required by f, specifically, by $\gamma_{t'_2,t'_1}$. So the intuitive meaning of $\sqsubseteq$ may be phrased as "can be used without type-fault as".

With this intuitive understanding, the purely formal properties of $\sqsubseteq$ may be characterized. The properties of a quasi-ordering and the definition of $\sqsubseteq$ may guarantee that $\sqsubseteq$ is not merely a quasi-ordering, $\sqsubseteq$ is a partial ordering. As a partial ordering, $\sqsubseteq$ obeys the additional axiom of anti-symmetry: if $T_1 \sqsubseteq T_2$ and $T_2 \sqsubseteq T_1$, then $T_1 = T_2$.

Overload Resolution

Many programming languages, for example C++, may allow distinct function definitions to have the same name, provided that the argument types are distinct. Each such function definition may be said to be an overload. If two overloads share the same name, then the language definition specifies, for an application of that function name, which overload function application may actually call. The issue of how to resolve overloads in the presence of coercions 155 has bedeviled language design. For example, let $f_1$ and $f_2$ be overloads of the same name f, and let $t_{i1}$ be the argument representation type 150 of $f_i$. Assume that $t_{11} \ne t_{21}$ and that $f_1$ and $f_2$ are the only overloads of f. Consider the construct f(x) where the type of x is t'. The overload that should be called is not obvious. A possibility may be that $\tau t_{11} = \tau t_{21}$. For example, a language that uses an embodiment of this invention may specify that a specific type is coerced to another specific type. However, in an embodiment of this invention may not need to provide specific type to type coercions 155.

In other words, an embodiment of the invention may be independent of the particular choice of types and coercions 155 that may be used in any particular context. We may thus assume that $\tau t_{i1} = T_{i1}$ for i=1 and 2, and that $T_{11} \ne T_{21}$. Define T' to be $\tau t'$. An embodiment of this invention may specify that the answer of which overload function application call depends only upon the correctness types 160 $T_{11}$, $T_{21}$, and T'. Suppose first that $T' \not\sqsubseteq T_{i1}$ for both i=1 and 2. Then x may not be coerced to either argument type, and the construct f(x) may be said to have a type fault. If $T' \sqsubseteq T_{11}$ and $T' \not\sqsubseteq T_{12}$, then obviously f(x) should call $f_1$, and there may be a symmetric case for when calling $f_2$ is the only option. The interesting case is when $T' \sqsubseteq T_{i1}$ for both i=1 and 2. One possibility is that $T_{11}, T_{21}$ (i.e., $T_{11} \sqsubseteq T_{21}$ and $T_{11} \ne T_{21}$). In this case, it may be preferable to call $f_1$. A more technical justification is provided later, but the intuitive idea may be to coerce to the nearest available argument type. If $T' \sqsubseteq T_{11} \sqsubseteq T_{21}$, then $T_{21}$ may be "farther" from T' than $T_{11}$. Symmetrically, if $T_{21} \sqsubseteq T_{11}$, then $f_2$ may be called by function application. Otherwise, $T_{11}, T_{21}$ may be unordered (by definition, meaning that $T_{11} \not\sqsubseteq T_{21}$ and $T_{21} \not\sqsubseteq T_{11}$) and it may not be clear what to do.

However, suppose the type system required the following:
For any $T_1$ and $T_2$, there exists a $T_0$ such that:
$T_0 \sqsubseteq T_1$ and $T_0 \sqsubseteq T_2$.
If $T'_0 \sqsubseteq T_1$ and $T'_0 \sqsubseteq T_2$, then $T'_0 \sqsubseteq T_0$.

By a well-known lattice theoretic result, $T_0$ is unique. $T_0$ may be called the greatest lower bound (glb) of $T_1$ and $T_2$, and may be denoted with an operator that suggests intersection: $T_1 \sqcap T_2$. A partial ordering for which glb exists is said to be a semilattice-ordering. While the programming languages C and C++ do not have a notion of type glb, Java does have such a notion for some types.

Constraints on Overloads

Intersection and overloads of f are described in this section. Since $T' \sqsubseteq T_{i1}$ for i=1 and 2, we may conclude that $T' \sqsubseteq T_{11} \sqcap T_{21}$. Further, since $T' \neq \bot$, we conclude that $T_{11} \sqcap T_{21} \neq \bot$. If $f_1$ and $f_2$ are the only overloads of f, then the set of overloads of f may be said to be incomplete. Even before encountering an application of a function that does not have a natural overload resolution, the programming language implementation may look at the two overloads of f, with unordered types having a non-$\bot$ intersection, and issue a warning or error informing the user that there should be an overload whose correctness argument type $T_0$ satisfies $T_{11} \sqcap T_{21} \sqsubseteq T_0$. By requiring such a property of overloads, subject to some extensions defined later, the programming language definition may guarantee that if applications do not have a type-fault, then they can be resolved. This may require that correctness types 160 have a glb operation.

A few purely lattice-theoretic facts follow. The above definition of $\sqcap$ guarantees that $T_1 \sqsubseteq T_2$ if and only if $T_1 = T_1 \sqcap T_2$. (To gain some intuition here, think of $\sqsubseteq$ as set inclusion and $\sqcap$ as set intersection.) The definition of $\sqcap$ also guarantees that $\sqcap$ is idempotent ($T \sqcap T = T$), commutative ($T_1 \sqcap T_2 = T_2 \sqcap T_1$), and associative (($T_1 \sqcap T_2) \sqcap T_3 = T_1 \sqcap (T_2 \sqcap T_3)$). A semilattice, by definition, is a set together with a function that is idempotent, commutative, and associative. For example, consider any semilattice S, denoting its function by $\sqcap$. Define a relation on S, denoted $\sqsubseteq$, by the rule that $s_1 \sqsubseteq s_2$ if and only if $s_1 = s_1 \sqcap s_2$. Then $\sqsubseteq$ is a partial ordering and $\sqcap$ is its glb function. This fact will be useful, because it may provide two ways of looking at the same thing.

Function Types

Function types may be defined as types whose associated sets of values act as functions. Most type systems, even that for C, have some notion of function types. Given representation types 150 $t_1 \neq$ NEVER and $t_2$, one may form the function representation type 150 from $t_1$ to $t_2$, whose set of values may be defined as the set of all functions taking an argument of type $t_1$ and yielding a value of type $t_2$. For example, in C, with $t_1$=double and $t_2$=single, the function type is written single (*) (double). Here, the notation double ← single is a function type for a function that takes an argument of type single and yields a result of type double, or generically, $t_2 \leftarrow t_1$ is a function type for a function that takes an argument of type $t_1$ and yields a result of type $t_2$. Underneath, in both C and the notation here, a function type may be viewed as including a pair of types. (The type system may be assumed to be rich enough so that a single type can describe multiple arguments and results.)

While the type system of C may be viewed as having an implicit coercion from single to double, the type system of C does not have any coercions 155 of its function types. Suppose, for example, we have function representation types 185 $t_2 \leftarrow t_1$ and $t'_2 \leftarrow t'_1$. In an embodiment of the invention, coercions 155 on function types may be defined to work as follows.

The following addresses when is it true that $(t_2 \leftarrow t_1) \leq (t'_2 \leftarrow t'_1)$. Consider the example function f, which has type $t_1$ as its argument type and $t_2$ as its result type. More succinctly, f has representation type 150 $t_2 \leftarrow t_1$. Let g be another function whose argument type is $t'_2 \leftarrow t'_1$.

The following addresses when the construct g(f) may be type-correct. Consider what g may do with its argument. For example, g may call the argument on a value of type $t'_1$. By definition, such a value would be a type-correct argument to f when $t'_1 \leq t_1$. Similarly, consider what g does with the result of calling its argument f. For example, g may use the result of the call in a context expecting a value of type $t'_2$. This would be type-correct as long as $t_2 \leq t'_2$. Thus:

$$(t_2 \leftarrow t_1) \leq (t'_2 \leftarrow t'_1) \text{ if and only if } t_2 \leq t'_2 \text{ and } t'_1 \leq t_1$$

The following addresses the coerced value that may be passed to g. Based on the above discussion, the coerced value would be: $\gamma_{t'_2, t_2} \circ f \circ \gamma_{t_1, t'_1}$. In other words, $\gamma_{t'_2 \leftarrow t'_1, t_2 \leftarrow t_1}$ may be defined by the rule:

$$\gamma_{t'_2 \leftarrow t'_1, t_2 \leftarrow t_1}(f) = \gamma_{t'_2, t_2} \circ f \circ \gamma_{t_1, t'_1}$$

Note that the coercions 155 on the result types are in the same direction as that of the function types (it may be said to be covariant), but the coercion on the argument types is in the opposite direction from that on the function types (it may be said to be contravariant).

Intersection of Function Types

In an embodiment of the invention, correctness types 160 may likewise apply to everything previously mentioned above regarding representation types 150:

Given correctness types 160 $T_1 \neq \bot$ and $T_2$, $T_2 \leftarrow T_1$ is a correctness function type.

Given correctness types 160 $T_1$, $T_2$, $T'_1$, and $T'_2$, with $T_1 \neq \bot \neq T'_1$:

$$(T_2 \leftarrow T_1) \sqsubseteq (T'_2 \leftarrow T'_1) \text{ if and only if } T_2 \sqsubseteq T'_2 \text{ and } T'_1 \sqsubseteq T_1$$

The following addresses $(T_{12} \leftarrow T_{11}) \sqcap (T_{22} \leftarrow T_{21})$, given $T_{i2} \leftarrow T_{i1}$ for i=1 and 2. Because of contravariance, $T_{12} \sqcap T_{22} \leftarrow T_{11} \sqcap T_{21}$ may not provide a greatest lower bound for the ordering $\sqsubseteq$ on function types. The presence of contravariance might tempt one to require that the semilattice of correctness types 160 be a lattice, so it would have a union-like operator $\sqcup$. With a union-like operator $\sqcup$, a suitable proposed definition of the above intersection may be $T_{12} \sqcap T_{22} \leftarrow (T_{11} \sqcup T_{21})$. This may fix the contravariance problem with greatest lower bound, but it is incorrect for semantic reasons. (Briefly, the problem is that while $\sqcap$ always corresponds to logical conjunction, there are useful lattices in which $\sqcup$ does not correspond to logical disjunction, so the use of $\sqcup$ in the proposed definition may not be logically sound.)

In sum, for example, let $T_1$ and $T_2$ be sets of correctness types 160. These may be the same sets, $T_1$ may be viewed as possible argument types, and $T_2$ may be viewed as possible result types. As proposed, a candidate set of function types from $T_1$ to $T_2$ may be defined by $F_0(T_1, T_2) = T_2 \times (T_1 - \bot)$, where the following two facts may be observed:

There exists a partial ordering on $F_0(T_1, T_2)$ that is contravariant on the $T_1$ component and covariant on the $T_2$ component.

$F_0(T_1, T_2)$ may not be semilattice-ordered even with additional constraints on $T_1$.

A key to getting past the impasse of $F_0(T_1, T_2)$ not being semilattice-ordered even with additional constraints on $T_1$ may be to inject $F_0(T_1, T_2)$ into a larger set, which may be denoted by $F(T_1, T_2)$. A function may be defined on this set which may make it a semilattice. The function may be denoted by $\sqcap$, and the related partial ordering may be denoted by $\sqsubseteq$. A key property:

Let $\iota$ be the injection from $F_0(T_1, T_2)$ to $F(T_1, T_2)$. Then for $T_2 \leftarrow T_1$ and $T'_2 \leftarrow T'_1$ in $F_0(T_1, T_2)$:

$$(T_2 \leftarrow T_1) \sqsubseteq (T'_2 \leftarrow T'_1) \text{ if and only if } \iota(T_2 \leftarrow T_1) \sqsubseteq \iota(T'_2 \leftarrow T'_1)$$

Intuitively, $F(T_1, T_2)$ has a copy of $F_0(T_1, T_2)$ inside $F(T_1, T_2)$, with the same ordering.

The construction of $F(T_1, T_2)$ is described in detail below. The construction may require several steps:

Use the partial ordering $F_0(T_1, T_2)$ to construct a semilattice, denoted $F_1(T_1, T_2)$.

$F_1(T_1, T_2)$ may turn out to be too big for the set of function types, in that it may have different elements whose role as types may be identical. A particular equivalence relation $\approx$ may be defined on $F_1(T_1, T_2)$ that takes into account these equivalences. The set of partitions of this equivalence relation, denoted $F_1(T_1, T_2)/\approx$, is also a semilattice.

Providing an algorithm to compute the canonical form for elements of $F_1(T_1, T_2)/\approx$, By definition, $F(T_1, T_2)$ is the set of these canonical forms. Thus $F(T_1, T_2)$ is isomorphic to $F_1(T_1, T_2)/\approx$. The algorithm for canonical form may lead directly to an algorithm for computing $\sqcap$ and indirectly to an algorithm for $\sqsubseteq$ on $F(T_1, T_2)$. These algorithms may provide a practical implementation of function types.

Intersection of Function Types, Step 1

A universal semilattice over a partially ordered set P may be described, whose ordering may be denoted by $\sqsubseteq$. A subset of P may be defined to be unordered if each pair of elements is unordered. The set of elements for the semilattice may be given by:

$S = \{p \sqsubseteq P | p$ is finite, non-empty, and unordered$\}$

Let $p = \{p_1, \ldots, p_k\}$, where p may represent the symbolic expression $p_1 \sqcap \ldots \sqcap p_k$.

Given $p \sqsubseteq P$, define the minimal elements of p, abbreviated mnl(p), to be $\{p \in p | \exists p' \in p$ with $p' \sqsubseteq p\}$.

Given $p_1, p_2 \in S$, by definition $p_1 \sqcap p_2 = mnl(p_1 \cup p_2)$.

For example, let $p_i = \{p_i\}$ for $i=1$ and 2, where $p_1 \sqsubseteq p_2$. Then $p_1 \sqcap p_2$ reduces to $$mnl(55\, p_1) \cup \{p_2\}) = mnl(\{p_1, p_2\}) = \{p_1\} \text{'} = \text{'} p_1$$

This represents the symbolic equation $p_1 \sqcap p_2 = p_1$ when $p_1 \sqsubseteq p_2$.

S and $\sqcap$ form a semilattice. The partial ordering associated with this semilattice has the following algorithmic characterization:

$p_1 \sqsubseteq p_2$ if and only if for all $p_2 \in p_2$, there exists $p_1 \in p_1$ such that $p_1 \sqsubseteq p_2$.

There may be a natural way of injecting P into S, namely:

The map from P to S is given by defining $\iota(p)$ to be $\{p\}$. It satisfies:

Equation one:

$$p_1 \sqsubseteq p_2 \text{ if and only if } \iota(p_1) \sqsubseteq \iota(p_2) \qquad (1)$$

Figure 5:
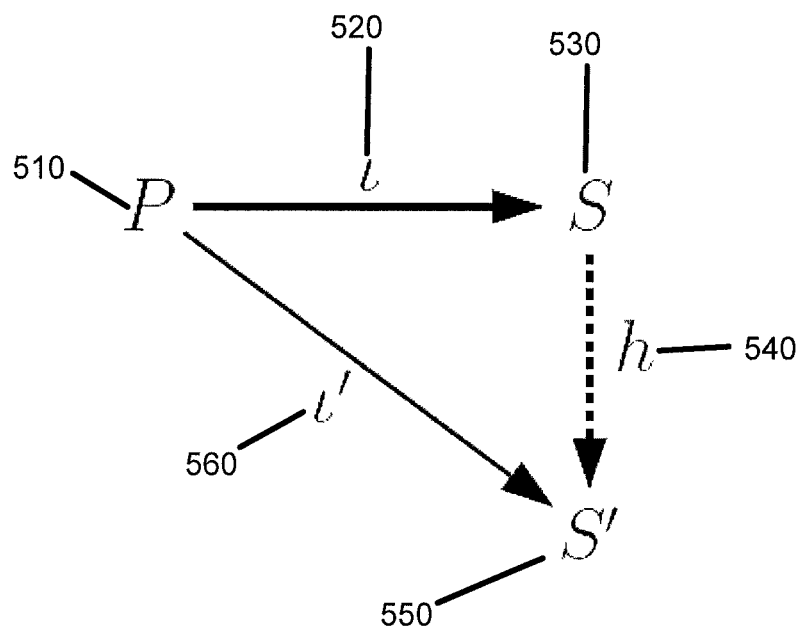
FIG. 5 illustrates an algebraic characterization of a universal semilattice over a partially ordered set using a commutative diagram in an illustrative embodiment.

FIG. 5 illustrates the algebraic characterization of a universal semilattice over a partially ordered set, using a mathematical technique known as a commutative diagram in an illustrative embodiment. The meaning of universal in this context is that if S' 550 is any other semilattice such that there is an injection $\iota'$ 560 from P 510 to S' 550 satisfying equation one (1) but with $\iota'$ 560 rather than $\iota$ 520, then there exists a unique map h 440 from S 530 to S' 550 such that:

$h(s_1 \sqcap s_2) = h(s_1) \sqcap h(s_2)$ $\iota' = h \circ \iota$ $F(T_1, T_2)$ may be obtained by applying the above construction to the partially ordered set $F_0(T_1, T_2)$ to create, for example, a semilattice.

Questions may arise such as to what do the elements of $F_1(T_1, T_2)$ mean as correctness types 160 and what is the underlying set of representation types 150 that some $\tau$ maps to $F_1(T_1, T_2)$. For example, suppose that $T_{11}, T_{21} \in T_1$ are unordered and non-$\perp$, and let $T_{12}, T_{22} \in T_2$ be arbitrary. Then $T_{12} \leftarrow T_{11}$ and $T_{22} \leftarrow T_{21}$ are unordered, and:

Equation two:

$$\{T_{12} \leftarrow T_{11}, T_{22} \leftarrow T_{21}\} \in F_1(T_1, T_2) \qquad (2)$$

For $i=1$ and 2, let $f_i$ be an overload of the function f, and suppose that these are the only overloads of f. Let the correctness type 160 of $f_i$ be $T_{i2} \leftarrow T_{i1}$, and suppose that $T_{11} \sqcap T_{21} = \perp$, so this is a valid set of overloads. Since $T_{i1} \neq \perp$ and $T_{11} \sqcap T_{21} = \perp$, it follows that $T_{11}, T_{21}$ are unordered, so equation two (2) holds. This suggests what $\{T_{12} \leftarrow T_{11}, T_{22} \leftarrow T_{21}\}$ means as a correctness type 160: it is the type of the overall function f. For example:

It is valid to call f on a value whose correctness type 160 is $T_{11}$, and in this case, the result has correctness type 160 $T_{12}$; and it is valid to call f on a value whose correctness type 160 is $T_{21}$, and in this case, the result has correctness type 160 $T_{22}$.

The C and C++ programming languages do not have function types of this kind.

The representation types 150 corresponding to the correctness types 160 of $F_1(T_1, T_2)$ may be understood by asking what function values look like. In the case where function f consists of overloads $f_1$ and $f_2$, a value representing f includes two pointers, one to $f_1$ and one to $f_2$. An implemented representation of such value would commit to the order in which $f_1$ and $f_2$ appear in the value. So, for $t_{ij}$ such that $\tau t_{ij} = T_{ij}$, here are some possible representation types 150 that correspond to $\{T_{12} \leftarrow T_{11}, T_{22} \leftarrow T_{21}\}$ $<T_{12} \leftarrow T_{11}, T_{22} \leftarrow T_{21}>$ (describes the pair $f_1, f_2$)

$<T_{22} \leftarrow T_{21}, T_{12} \leftarrow T_{11}>$ (describes the pair $f_2, f_1$)

Note that such values may be passed as arguments and results, incorporated into data structures, etc.

Intersection of Function Types, Step 2

With this understanding of function representation types 150 and their corresponding values, we turn to the previous statement that $F_1(T_1, T_2)$ is too big. The technical statement behind this remark may be that correctness function types should characterize an overall function. For reasons detailed below, $F_1(T_1, T_2)$ may be constructed so that the following equality holds whenever $T_{11} \sqcap T_{21} \neq \perp$:

Equation three:

$$(T_{12} \leftarrow T_{11}) \sqcap (T_{22} \leftarrow T_{21}) = (T_{12} \leftarrow T_{11}) \sqcap (T_{22} \leftarrow T_{21})$$
$$\sqcap ((T_{12} \leftarrow T_{22}) \leftarrow (T_{11} \leftarrow T_{21})) \qquad (3)$$

To explain why equation three (3) should hold, suppose, for example, that the function g takes a function argument f and that g has two call sites of f, the $i^{th}$ site having an argument whose correctness type 160 is $T_{i1}$ and requires that the result has correctness type 160 $T_{i2}$. Let T be the correctness type 160 of f. Since f can be used at call site i, it may be plausible that where the correctness type 160 is effectively $T_{i2} \leftarrow T_{i1}$, that f is coercible to a value of this type, i.e., that $T \sqsubseteq T_{i2} \leftarrow T_{i1}$ for $i=1$ and 2. In a semilattice, this is equivalent to:

Equation four:

$$T \sqsubseteq (T_{12} \leftarrow T_{11}) \sqcap (T_{22} \leftarrow T_{21}) \qquad (4)$$

Conversely, if T obeys this inequality, then the type-correctness of the call sites in g may be guaranteed. Given that T is the type of f, equation four (4) may be the condition for the type-correctness of the construct g(f), under the assumption that the type of the argument of g is $(T_{12} \leftarrow T_{11}) \sqcap (T_{22} \leftarrow T_{21})$.

Suppose that a function f has overloads for i=1 and 2, and that $f_i$ has correctness type $160\ T_{i2} \leftarrow T_{i1}$. Since $T_{11} \sqcap T_{21} \neq \bot$, f should also have a third overload, whose correctness argument type is $T_{11} \sqcap T_{21}$. Let the correctness result type of this overload be $T_{02}$, so the overload has correctness function type $T_{02} \leftarrow T_{11} \sqcap T_{21}$. Since this overload of f may be called at either site of the argument of g, type-correctness requires $T_{02} \sqsubseteq T_{i2}$, for i=1 and 2, or equivalently, $T_{02} \sqsubseteq T_{12} \sqcap T_{22}$. This may be formalized by strengthening the constraint on overloads to include this rule on the result type, but weakening the constraint on the argument type:

If there are overloads of the same function with correctness types $160\ T_{i2} \leftarrow T_{i1}$ for i=1 and 2, and if $T_{11} \sqcap T_{21} \neq \bot$, then there must be an overload of the function with argument type $T_{01}$ such that $T_{11} \sqcap T_{21} \sqsubseteq T_{01}$ and result type $T_{02}$ such that $T_{02} \sqsubseteq T_{12} \sqcap T_{22}$.

Given the above, consider a function h which has two call sites of its argument with the same characteristics as those of g, but also has a third call site of its argument with correctness argument type $T_{11} \sqcap T_{21}$ and correctness result type $T_{12} \sqcap T_{22}$. As with g, the correctness argument type of g is:

Equation five:

$$(T_{12} \leftarrow T_{11}) \sqcap (T_{22} \leftarrow T_{21}) \sqcap ((T_{12} \sqcap T_{22}) \leftarrow (T_{11} \sqcap T_{21})) \quad (5)$$

Then f is also a type-correct argument to h. Thus, any type-correct argument to g may be a type-correct argument to h. The converse holds (g has a subset of the call site characteristics of those of h). As such, the intersection type in equation five (5) and the right-hand side of equation four (4) are the same. This equality is what explains equation three (3).

Intersection of Function Types, Step 3

Mathematically, $F(T_1, T_2)$ may be defined to be $F_1(T_1, T_2)$ modulo the equivalence relation given by equation three (3). It is not clear a priori that such a semilattice exists. An algorithmic construction of such a semilattice may be used to imply the existence of such a semilattice. A step in the construction of the semilattice may be an algorithm for computing the canonical representation of elements. For example:

Let $p \in F_1(T_1, T_2)$, and let $<T_{i2}, T_{i1}> \in p$ for i=1 and 2, and define p' to be $p - <T_{12}, T_{11}> - <T_{22}, T_{21}>$. Then by the construction of $F_1(T_1, T_2)$:

$$p = p' \sqcap (T_{12} \leftarrow T_{11}) \sqcap (T_{22} \leftarrow T_{21})$$

Suppose $T_{11} \sqcap T_{21} \neq \bot$. Then by equation three (3):

$$p = p' \sqcap (T_{12} \leftarrow T_{11}) \sqcap (T_{22} \leftarrow T_{21}) \sqcap ((T_{12} \sqcap T_{22}) \leftarrow (T_{11} \sqcap T_{21}))$$

Undoing the liberties with notation and using the algorithm for $\sqcap$ in $F_1(T_1, T_2)$:

$$p \approx mnl(p \cup \{<T_{12}, T_{11}>, <T_{22}, T_{21}>, <T_{12} \sqcap T_{22}, T_{11} \sqcap T_{21}>\}) = mnl(p + <T_{12} \sqcap T_{22}, T_{11} \sqcap T_{21}>)$$

It may be possible for the final set here to be exactly the same as S, and if this is so for every possible pair $<T_{i2}, T_{i1}> \in S$, then S is said to be in function semilattice canonical form. More algorithmically, we use the next definition, which then leads to a definition of $F(T_1, T_2)$:

$p \in F_1(T_1, T_2)$ is said to be in canonical form when for every pair of elements $<T_{i2}, T_{i1}>$ in p, for i=1 and 2, either $T_{11} \sqcap T_{21} = \bot$ or there exists $<T_2, T_1> \in p$ such that $T_2 \leftarrow T_1 \sqsubseteq (T_{12} \sqcap T_{22}) \leftarrow (T_{11} \sqcap T_{21})$.

By definition, $F(T_1, T_2) = \{p \in F_1(T_1, T_2) | p$ is in canonical form$\}$.

An algorithm to compute the canonical form, called the function semilattice reduction algorithm follows:

canonicalize$(p \in F_1(T_1, T_2)) \rightarrow F(T_1, T_2)$

While $<T_{i2}, T_{i1}>$ for i=1 and 2 is a counter-example to canonical form: –Set p to mnl$(p + <T_{12} \sqcap T_{22}, T_{11} \sqcap T_{21}>)$.

Return p as the final result.

Figure 6:
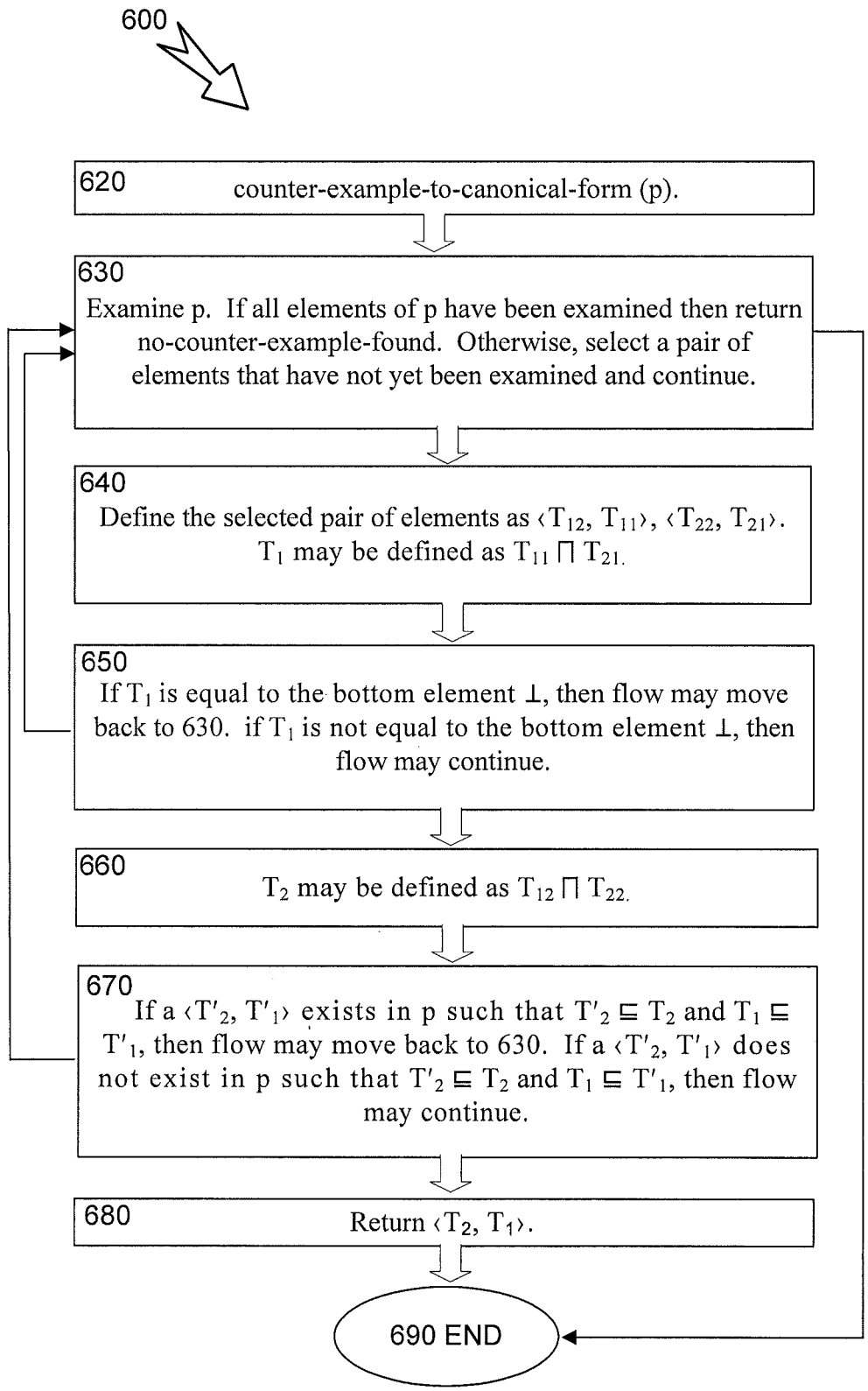
FIG. 6 illustrates an example flowchart describing a counter-example-to-canonical-form function performed in a programming environment in an illustrative embodiment.

FIG. 6 illustrates an example flowchart 600 describing a counter example to canonical form performed in programming environment 100 in an illustrative embodiment. In block 620, execution of the counter-example-to-canonical-form function may begin. The counter-example-to-canonical-form function may accept p as a parameter and may return no-counter-example-found or a pair of elements.

In block 630, a pair of elements of p may be examined. If all the elements of p have been examined, the function may return no-counter-example-found and flow may end at 690. If a pair of elements of p remains to be examined, flow may continue.

In block 640, the pair of elements to be examined may be defined as $<T_{12}, T_{11}>, <T_{22}, T_{21}>$. $T_1$ may be defined as $T_{11} \sqcap T_{21}$.

In block 650, a check may be performed to determine whether $T_1$ is equal to the bottom element $\bot$, then flow may move back to 630. If $T_1$ is not equal to the bottom element $\bot$, then flow may continue.

In block 660, $T_2$ may be defined as $T_{12} \sqcap T_{22}$.

In block 670, a check may be performed to determine whether a $<T'_2, T'_1>$ exists in p such that $T'_2 \sqsubseteq T_2$ and $T_1 \sqsubseteq T'_1$, if so, then flow may move back to 630. If a $<T'_2, T'_1>$ does not exist in p such that $T'_2 \sqsubseteq T_2$ and $T_1 \sqsubseteq T'_1$, then flow may continue.

In block 680, the function may return $<T_2, T_1>$ and flow may move to 690 and end.

It may be proved that (a) this algorithm always terminates, and (b) the final result is independent of arbitrary choices made for $<T_{i2}, T_{i1}>$. Neither fact is obvious, and the proofs are omitted here because the proofs are not necessary to practice an embodiment of the invention.

Figure 7:
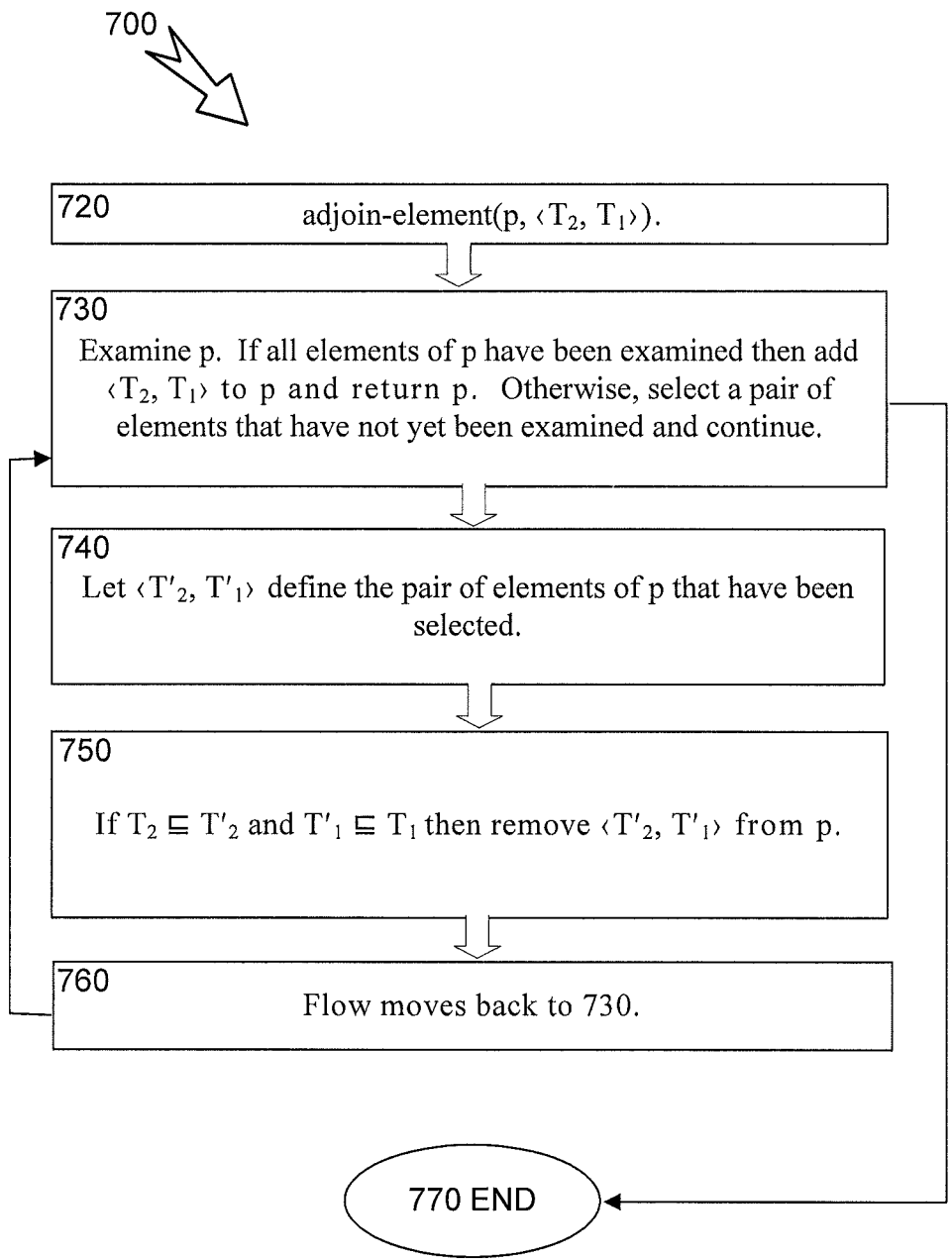
FIG. 7 illustrates an example flowchart describing an adjoin-element function performed in a programming environment an illustrative embodiment.

FIG. 7 illustrates an example flowchart 700 describing an adjoin-element function performed in programming environment 100 in an illustrative embodiment. In block 720, execution of the adjoin-element function may begin. The adjoin-element function may accept p and a pair of elements as parameters and may return a modified p.

In block 730, p may be examined. A check may be performed to determined whether all of the elements in p have been examined, if so then $<T_2, T_1>$ may be added to p and the modified p may be returned and flow may move to 770 and end. If not all of the elements in p have been examined, then a pair of elements may be selected and flow may continue.

In block 740, the selected pair of elements may be defined as $<T'_2, T'_1>$.

In block 750, a check may be performed to determine whether $T_2 \sqsubseteq T'_2$ and $T'_1 \sqsubseteq T_1$, if so, remove $<T'_2, T'_1>$ from p.

In block 760, flow may move back to 730.

Figure 8:
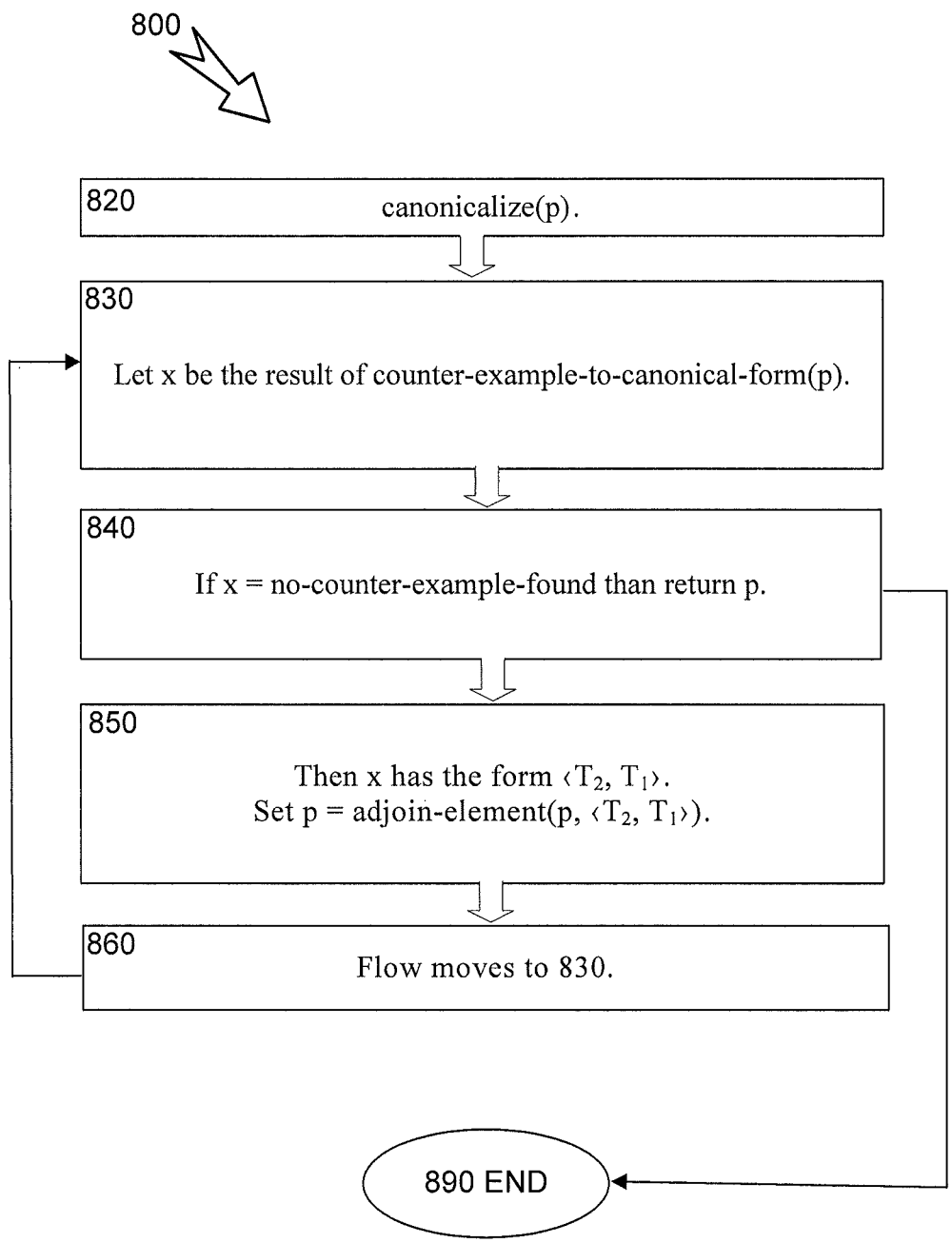
FIG. 8 illustrates an example flowchart describing a canonicalize function performed in a programming environment in an illustrative embodiment.

FIG. 8 illustrates an example flowchart describing canonicalize function performed in programming environment 100 in an illustrative embodiment. In block 820, execution of the canonicalize function may begin. The canonicalize function may accept p as a parameter and may return a modified p.

In block 830, x may be the result of calling counter-example-to-canonical-form 600 with p as a parameter.

In block 840, x may be examined. A check may be performed to determine whether x is equal to no-counter-example-found, if so, then p should be returned and flow may move to 890 and end. If x is not equal to no-counter-example-found then flow may continue.

In block 850, the value x may have the form $<T_2, T_1>$. The value p may be set equal to adjoin-element 600 with the parameters p and $<T_2, T_1>$.

In block 860, flow may move to 830.

The definition of $F(T_1, T_2)$ makes it clear that $F(T_1, T_2) \sqsubseteq F_1(T_1, T_2)$. The semilattice operation defined in $F_1(T_1, T_2)$ by $\sqcap_1$ and its partial ordering may be denoted by $\sqsubseteq_1$. This notation may be used in the implementation of the semilattice and associated partial ordering on $F_1(T_1, T_2)$, using $\sqcap$ and $\sqsubseteq$.
The algorithms for the semilattice (all $p_i \in F(T_1, T_2)$):
   $\sqcap$ takes $(p_1, p_2)$ as arguments and returns $p_0$ as a result:
   Return canonicalize($p_1 \sqcap_1 p_2$).
   $\sqsubseteq$ takes $(p_1, p_2)$ and returns false or true as a result
   Return $p_1 \sqsubseteq_1 p_2$.

Figure 9:
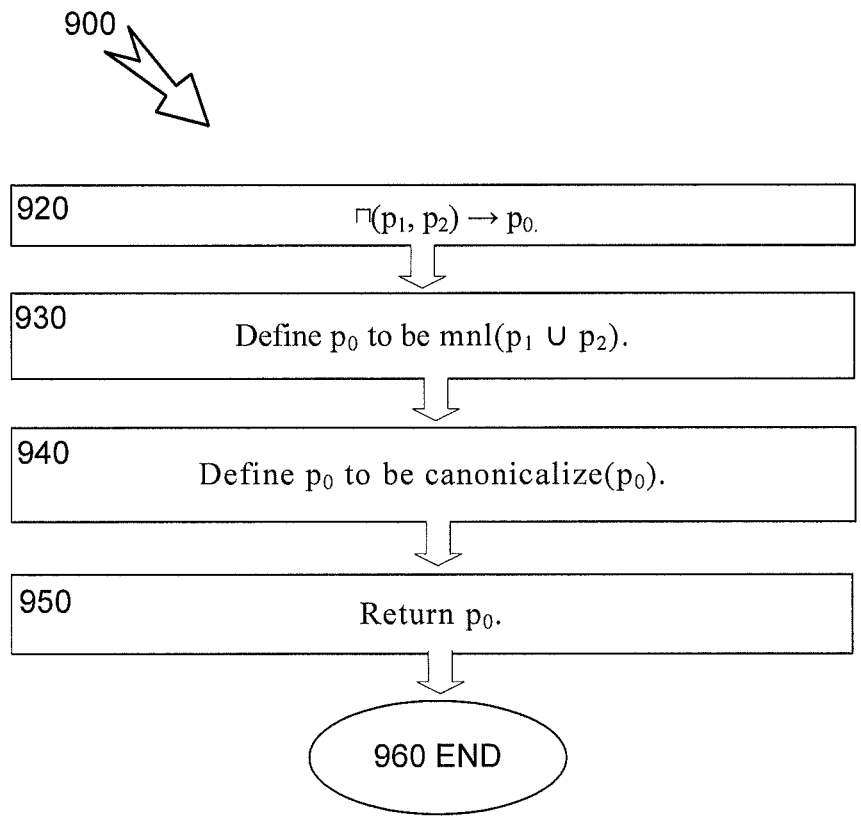
FIG. 9 illustrates an example flowchart describing the process for calculating the greatest lower bound performed in a programming environment in an illustrative embodiment.

FIG. 9 illustrates an example flowchart 900 describing the process for greatest lower bound $\sqcap$ performed in programming environment 100 in an illustrative embodiment. In block 920, execution of the $\sqcap$ function may begin. Then $\sqcap$ function may accept $p_1$ and $p_2$ as parameters and return $p_0$.

In block 930, the value $p_0$ may be defined as $mnl(p_1 \cup p_2)$. Based on the discussion above, $p_1 \sqcap_1 p_2 = mnl(p_1 \cup p_2)$.

In block 940, $p_0$ may be defined to be canonicalize($p_0$) as in FIG. 8.

In block 950, $p_0$ may be returned and flow may end at 960.

Figure 10:
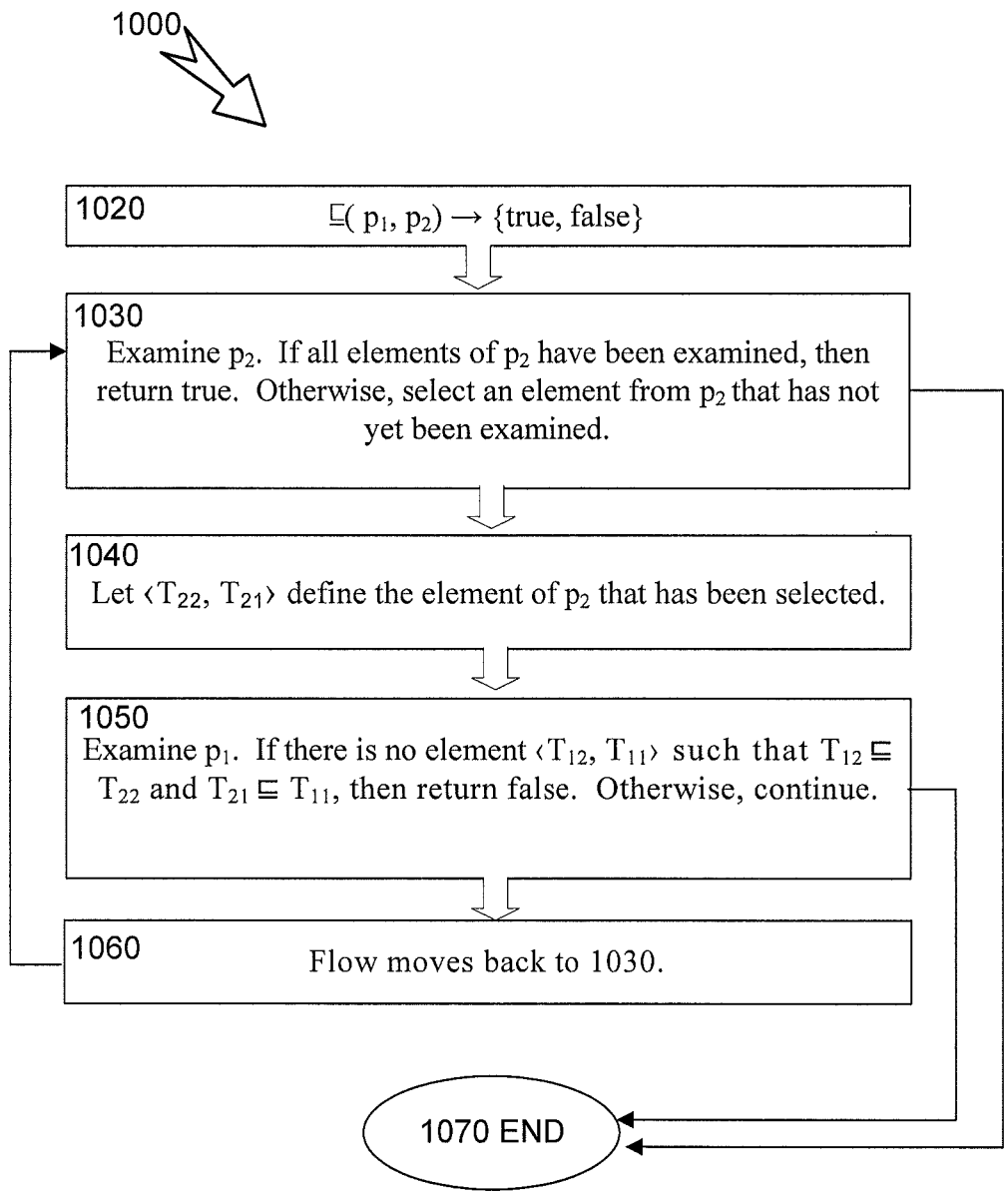
FIG. 10 illustrates an example flowchart describing the process for a lattice operator less-than-or-equal-to performed in a programming environment in an illustrative embodiment.

FIG. 10 illustrates an example flowchart 1000 describing the process for a lattice operator less-than-or-equal-to $\sqsubseteq$ function performed in programming environment 100 in an illustrative embodiment. In block 1020, execution of the $\sqsubseteq$ function may begin. The $\sqsubseteq$ function may accept $p_1$ and $p_2$ as parameters and return either true or false.

In block 1030, $p_2$ may be examined. A check may be performed to determined whether all elements of $p_2$ have been examined, if so, then the function may return true, and flow may move to 1070 and end. If not all elements of $p_2$ have been examined, then an element from $p_2$ may be selected that has not yet been examined and flow may continue.

In block 1040, the selected element of $p_2$ may be defined as $<T_{22}, T_{21}>$.

In block 1050, $p_1$ may be examined. A check may be performed to determine whether there is no element $<T_{12}, T_{11}>$ such that $T_{12} \sqsubseteq T_{22}$ and $T_{21} \sqsubseteq T_{11}$, if so, then return false, and flow may move to 1070 and end. If there is an element $<T_{12}, T_{11}>$ such that $T_{12} \sqsubseteq T_{22}$ and $T_{21} \sqsubseteq T_{11}$, then flow may continue.

In block 1060, flow may move back to 1030.

The idempotency and commutativity of $\sqcap$ follow from the same properties of $\sqcap_1$, but the following are not obvious (and the proofs are omitted):
   $\sqcap$ is associative and is the glb for $\sqsubseteq$.
   $\sqsubseteq$ coincides with $\sqsubseteq_1$ on $F(T_1, T_2)$.
   For all $p_1, p_2 \in F(T_1, T_2)$:
      canonicalize($p_1 \sqcap_1 p_2$)=canonicalize($p_1$)$\sqcap$ canonicalize($p_2$)

Another (and also non-obvious and not proved here) property of this construction requires a preliminary definition.
   Let S be any lattice, and let $\kappa$ be a map from $F_0(T_1, T_2)$ to S. For clarity, the operator and ordering on S may be denoted as $\sqcap_s$ and $\sqsubseteq_s$. Viewing $F_0(T_1, T_2)$ as a partially ordered set in the usual way, $\kappa$ may be referred to as compliant (i.e., with equation three (3)) when it satisfies these conditions:
      If $<T_{12}, T_{11}> \sqsubseteq <T_{22}, T_{21}>$, then $\kappa(T_{11}, T_{12}) \sqsubseteq_s \kappa(T_{21}, T_{22})$.
      For all $<T_{i2}, T_{i1}> \in F_0(T_1, T_2)$, for i=1 and 2, with $T_{11} \sqcap_1 T_{12} \neq \bot$: $\kappa(T_{11}, T_{12}) \sqcap_s \kappa(T_{21}, T_{22}) = \kappa(T_{11}, T_{12}) \sqcap \kappa(T_{21}, T_{22}) \sqcap_s \kappa(T_{12} \sqcap_2 T_{22}, T_{11} \sqcap_1 T_{12})$
   Define $\kappa_F$ from $F_0(T_1, T_2)$ to $F(T_1, T_2)$ by $\kappa(T_1, T_2)=\{<T_2, T_1>\}$. Then $\kappa_F$ is compliant, and if S is any semilattice and there is a compliant $\kappa$ from $F_0(T_1, T_2)$ to S, then there exists a unique h such that:
      For all $p_1, p_2 \in F(T_1, T_2)$, $h(p_1 \sqcap p_2)=h(p_1) \sqcap_s h(p_2)$.
      $\kappa = h \circ \kappa_F$.

Figure 11:
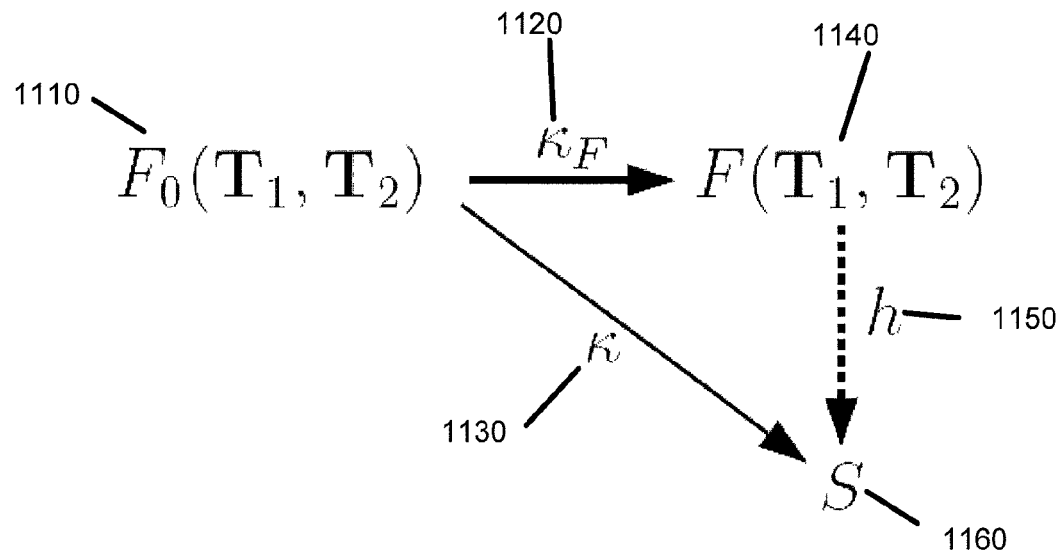
FIG. 11 illustrates an algebraic characterization of a universal function semilattice over a compliant map using a commutative diagram in an illustrative embodiment.

FIG. 11 illustrates an algebraic characterization of a universal function semilattice over a compliant map using a mathematical technique known as a commutative diagram.

FIG. 11 includes semilattices $F_0(T_1, T_2)$ 1110 and $F(T_1, T_2)$ 1140, semilattice S 1160, and maps h 1150, $\kappa$ 1130 and $\kappa_F$ 1120. The meaning of universal in this context is that if S 1160 is any other semilattice such that there is an injection $\kappa$ 1130 from $F_0(T_1, T_2)$ 1110 to S 1160 instead of $\kappa_F$ 1120 from $F_0(T_1, T_2)$ 1110 to $F(T_1, T_2)$ 1140, then there exists a unique map h 1150 from $F(T_1, T_2)$ 1140 to S 1160 such that:
   For all $p_1, p_2 \in F(T_1, T_2)$, $h(p_1 \sqcap p_2)=h(p_1) \sqcap_s h(p_2)$
   $\kappa = h \circ \kappa_F$ By definition, a function semilattice 130 over a pair of semilattices $T_1, T_2$ is a set S' that is in 1-1 correspondence with $F(T_1, T_2)$, and which thus supports a function from $F_0(T_1, T_2)$ that is equivalent to $\kappa_F$, and a glb operations that is equivalent to glb on $F(T_1, T_2)$.

Intersection of Function Types, Summary

In an embodiment of the invention, start with two sets of representation types 150 $T_1$ and $T_2$, and associated coercions 155, as described above. Also as described above, obtain sets of correctness types 160 $T_1$ and $T_2$. Initial consideration of overload resolution 180 may lead to requiring that the $T_i$ may be semilattice-ordered. Denote the intersection operator on $T_i$ by $\sqcap_i$. The ability to always and unambiguously chose an overload to invoke when there is no apparent type-fault may lead to requirements that the set of overloads must obey certain constraints related to $\sqcap_1$. These constraints may then lead to a definition of a set of correctness types 160 $F(T_1, T_2)$ and a semilattice operation on them, which may be denoted $\sqcap$. This construction may describe function types from $T_1$ to $T_2$.

In another embodiment of the invention, the partially ordered set that corresponds to the above semilattice is isomorphic to the set of equivalence classes of a certain quasi-ordering whose elements may be viewed as representation types 150 of functions from $T_1$ to $T_2$, where each function value is represented by a list of overloads, and where coercion is defined by composition of overloads with coercion of the argument (before the call on the overload) and of the result (after the call on the overload).

Using the Canonical Form of Correctness Types to Reformulate the Constraint on Overload Arguments The above description introduced the use of the intersection of types to address overload resolution. The above description also suggested a constraint on the correctness types 160 of overload arguments to avoid type-faults, provided only that the types of the overload argument types cover the type of an argument at a call site. Because this constraint may use the intersection of types and because it may be desirable to have an overload resolution rule that works for all functions, including those with function arguments, the type system of this invention defines the intersection of function types. This culminates in the construction of a particular semilattice given semilattices for correctness argument types and result types. An element of this construction is a canonical form for elements of the semilattice.

In another embodiment of the invention, the canonical form of correctness types 160 may be used to reformulate the constraint on overload arguments. This constraint may have an advantage that in certain circumstances, for example, it may reduce the number of overloads that must be defined. However, one consequence is that the constraint may align the behavior of the correctness type 160 of the overall function with the representation types 150 of the overloads. As such, analysis based on the correctness types 160 of functions reflects what happens in the overloads.

The constraints assume a function f with overloads $f_1, \ldots, f_k$, k>0, where $f_i$ has the function representation type 150 $t_{i2} \leftarrow t_{i1}$, i.e., the argument representation type 150 is $t_{i1}$ ($t_{i_1} \neq$ NEVER) and the result representation type 150 is $t_{i2}$. For convenience, $T_{ij}$ may be defined to be $\tau t_{ij}$, for $i=1, \ldots, k$ and $j=1$ or 2. The constraints, with suggestive names:

Argument Representation Type Distinctness If $i_1 \neq i_2$, then $t_{i_1,1} \neq t_{i_2,1}$. In other words, the set $\{<t_{i2}, t_{i1}>\}_{i=1,\ldots,k}$ has distinct second components.

Argument Correctness Type Distinctness If $t_{i_1,1} = t_{i_2,1}$, then $t_{i_1,2} = t_{i_2,2}$. In other words, the set $\{<t_{i2}, t_{i1}>\}_{i=1,\ldots,k}$ has distinct second components.

No Missing Overloads If $t_{i_1,1}$, $t_{i_2,1}$ are unordered and $t_{i_1,1} \sqcap t_{i_2,1} \neq \bot$, then there exists i such that $t_{i_1,1} \sqcap t_{i_2,1} \sqsubseteq t_{i1}$ and $t_{i2} \sqsubseteq t_{i_1,2} \sqcap t_{i_2,2}$.

Consistent Coercibility If $t_{i_1,1} \sqsubseteq t_{i_2,1}$, then $t_{i_1,2} \sqsubseteq t_{i_2,2}$.

In another embodiment of the invention, define $T_f$ to be $mnl\{<T_{i2}, T_{i1}>\}_{i=1,\ldots,k}$. From the definition of $F_1(T_1, T_2)$ as having elements that are unordered sets, it follows that $T_f \in F_1(T_1, T_2)$. Less obviously, if the above constraints are met, then $T_f \in F(T_1, T_2)$. In other words, $T_f$ is in canonical form, or that canonicalize($T_f$)=$T_f$. Thus, $T_f$ is the correctness type 160 of f. Choosing a representation type 150 of f involves picking an order for the overloads. If that order is $1, \ldots, k$, then $t_f = <<t_{12}, t_{11}>, \ldots, <t_{k2}, t_{k1}>>$ is the representation type 150. This leads to:

Given sets of representation types 150 $T_i$ and maps $\tau_i$ to sets of correctness types 160 $T_i$, for $i=1$ and 2, a non-empty sequence $<<t_{i2}, t_{i1}>>_{i=1,\ldots,k}$ may be defined to be an admissible function representation type 185 when it obeys the constraints on overloads (which are stated, after all, using only $T_i$, $\tau_i$, $T_i$).

With the same notation, the set of function representation types 150 from $T_1$, $\tau_1$, $T_1$ to $T_2$, $\tau_2$, $T_2$ is by definition:

$$F = \{t \in (F_0(T_1, T_2))^k | k > 0, t \text{ is admissible}\}$$

The notation F suppresses the dependence on $T_i$, $\tau_i$, $T_i$.

The map $\tau$ from F to $F(T_1, T_2)$ is given by:

$$\tau(<<t_{i2}, t_{i1}>>_{i=1,\ldots,k}) = mnl\{<\tau_2 t_{i2}, \tau_1 t_{i1}>>_{i=1,\ldots,k}\}$$

By the above remarks, the range of $\tau$ is indeed $F(T_1, T_2)$.

In defining quasi-ordering on F, the definition may use the quasi-ordering $\leq_i$ defined on $T_i$:

$$<<t_{1,i,2}, t_{1,i,1}>>_{i=1,\ldots,k2} \leq <<t_{2,i,2}, t_{2,i,1}>>_{i=1,\ldots,k_1}$$ if and only if for every $i_2 \in \{1, \ldots, k_2\}$, there exists $i_1 \in \{1, \ldots, k_1\}$ such that:

$$t_{1,i_1,2} \leq_2 t_{2,i_2,2} \text{ and } t_{2,i_2,1} \leq_1 t_{1,i_1,1},$$

Omitted are the proofs that $\leq$ is a quasi-ordering and that $\tau t_1 = \tau t_2$ if and only if $t_1 \approx t_2$. To complete the definition of F, $\gamma_{t_2, t_1}$ may need to be defined when $t_1 \leq t_2$. That definition may use a technique developed in the next section.

Note, a consequence of consistent coercibility may be that picking the nearest available overloads avoids, if possible, type-faults in nested applications. For example, in f(g(x)), if the nearest overload of g may be chosen for the invocation at x, then the result of g(x) may be the most coercible, (smallest in $\sqsubseteq$) that is possible. Making any other choice might cause an unnecessary type-fault at the invocation of f.

Overload Resolution Rule

Another embodiment of the invention may include an overload resolution rule, which uses the fact that sets of overloads obey the constraints of the previous section. For example, suppose there is a function f with representation type 150 $t_f$, as above. In the call f(x), let x have representation type 150 t. Here is a function that produces either the index i where $f_i$ is the function to invoke, or else a value referred to as type-fault, meaning that x is not a type-correct argument of f:

overload-resolution-rule($t_f$ a function representation type 185, t a representation type 150)→i or type-fault Let $T_f$ be $\tau t_f$, i.e., the correctness function type corresponding to $t_f$.

Let T be $\tau t$, i.e., the correctness function type corresponding to t.

Let E be the set $\{<T_2, T_1> \in T_f | T \sqsubseteq T_1\}$. These are the set of eligible overloads, i.e., those whose arguments types do not rule out being called.

If E=∅, then return type-fault. Otherwise, continue with the following steps.

Define $R = mnl\{T_2 | <T_2, T_1> \in E\}$. It is not obvious, but it is nevertheless the case that R has a single element, which we will denote $T_{result}$.

For convenience in the next step, let $t_f = <<t_{i2}, t_{i1}>>_{i=1,\ldots,k}$.

Define $A = mnl\{\tau t_1 | \tau t_2 = T_{result} \text{ for some } i=1, \ldots, k\}$. Like R, A has a single element, which we will denote $T_{argument}$.

The result i will satisfy the equations $\tau t_{i1} = T_{argument}$ and $\tau t_{i2} = T_{result}$. The set of such indices is non-empty, and in practice usually includes one element. In the case of more than one such i, the final choice is made on the basis of the relationship between t and $t_{i1}$.

Return i.

Note that the representation type 150 of the result of f(x) may depend upon the choice of i (if indeed there is a choice), but that the correctness type 160 is $T_{result}$, which is independent of i.

Figure 12:
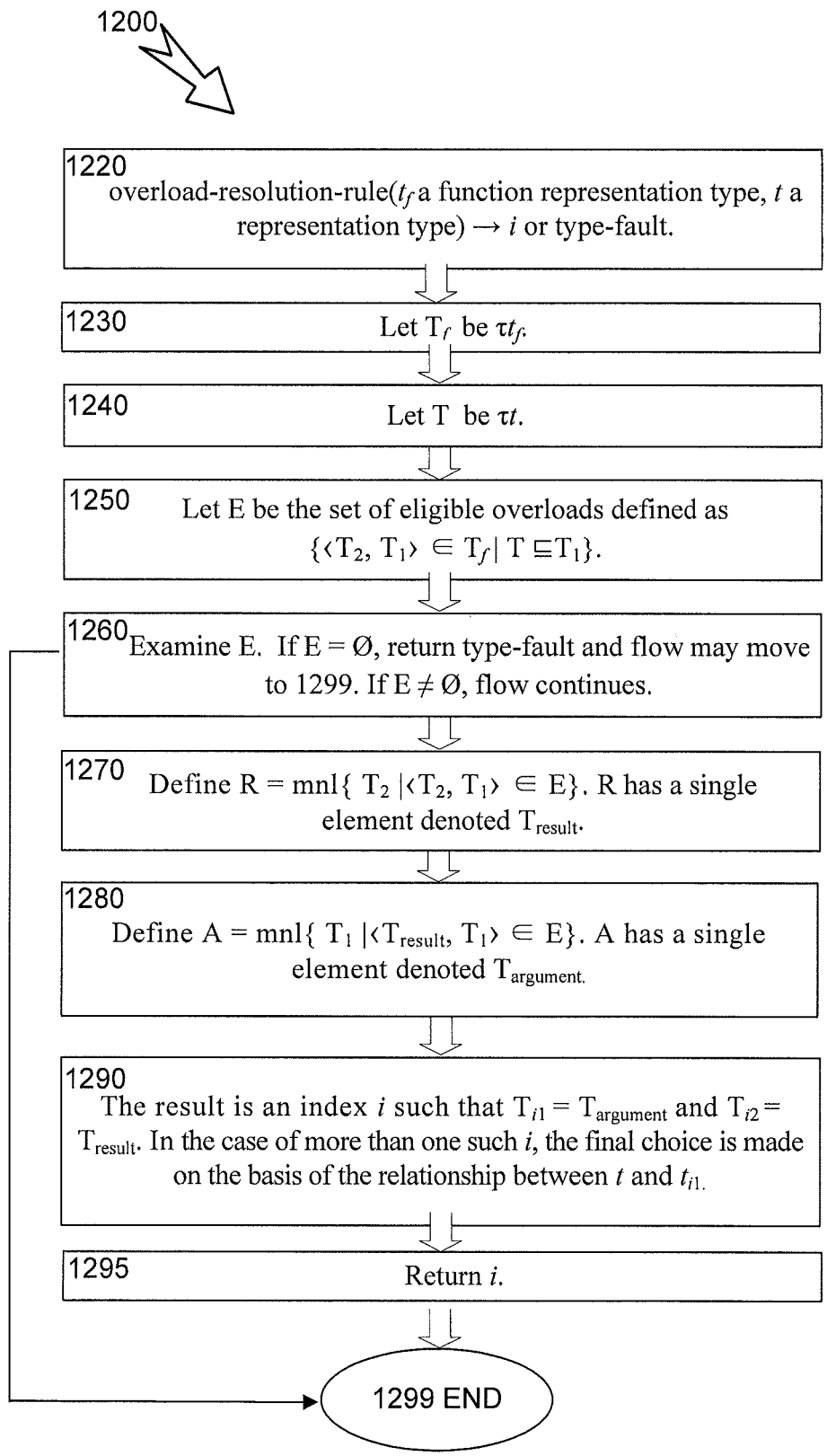
FIG. 12 illustrates an example flowchart describing the overload resolution rule performed in a programming environment in an illustrative embodiment.

FIG. 12 illustrates an example flowchart 1200 describing the overload resolution rule performed in a programming environment 100 in an illustrative embodiment. In block 1220, execution may begin by calling the overload-resolution-rule function. The overload-resolution-rule function may accept two parameters $t_f$, a function representation type 185 of function f, and t, a representation type 150 of an argument to function f. The overload-resolution-rule function may return either i or a type-fault. Returning index i indicates that $f_i$ is the function to invoke. Returning a type-fault indicates that there is not a representation type 150 t that is a type-correct argument to function f.

In block 1230, $T_f$ may be $\tau t_f$.

In block 1240, T may be $\tau t$.

In block 1250, E may be the set of eligible overloads (i.e., those whose arguments types do not rule out being called) defined as $\{<T_2, T_1> \in T_f | T \sqsubseteq T_1\}$.

In block 1260, E may be examined. A check may be performed to determine whether E=∅, if so, return type-fault and flow may move to 1295 and end. If E≠∅, flow may continue.

In block 1270, R may be defined as $R = mnl\{T_2 | <T_2, T_1> \in E\}$. It is not obvious, but it is nevertheless the case that R has a single element, which is denoted $T_{result}$.

In block 1280, A may be defined as $A = mnl\{T_1 | <T_{result}, T_1> \in E\}$. Like R in 1270, A has a single element, denoted $T_{argument}$.

In block 1290, the result may be an index i such that $T_{i1} = T_{argument}$ and $T_{i2} = T_{result}$. This set is non-empty, and in practice usually includes one element. In the case of more than one such i, the final choice is made on the basis of the relationship between t and $t_{i1}$.

In block 1295, the value i may be returned and the function may end at 1299.

For $t_1, t_2 \in F$ with $t_1 \leq t_2$, the definition of the function coercion 170 algorithm, denoted $\gamma_{t_2, t_1}$ uses the overload resolution rule 180. Recall that the definition of $\leq$ says that for all $i_2 \in \{1, \ldots, k_2\}$ there exists $i_1 \in \{1, \ldots, k_1\}$ such that $t_{1,i_1,2} \leq_2 t_{2,i_2,2}$ and $t_{2,i_2,1} \leq_1 t_{1,i_1,1}$. By the overload resolution rule, if there exists an $i_1$, then the overload resolution picks a particular one, given by $i_1 = r(i_2)$. Thus, when $t_h = <<t_{hi2}, t_{hi1}>>i=1, \ldots, k_h$ for h=1 and 2, and $t_1 \leq t_2$, define, for any $f = <f_1, \ldots, f_{k_1}> \in V_{t_1}$:

$$\gamma_{t_2, t_1}(f) = <<\gamma_{t_{2,i,2}, t_{1,r(i),2}} \circ f_{r(i)} \circ \gamma_{t_{1,r(i),1}, t_{2i1}}>> i=1, \ldots, k_2$$

This equation, abstracted over f, defines $\gamma_{t_2, t_1}$.

Figure 13:
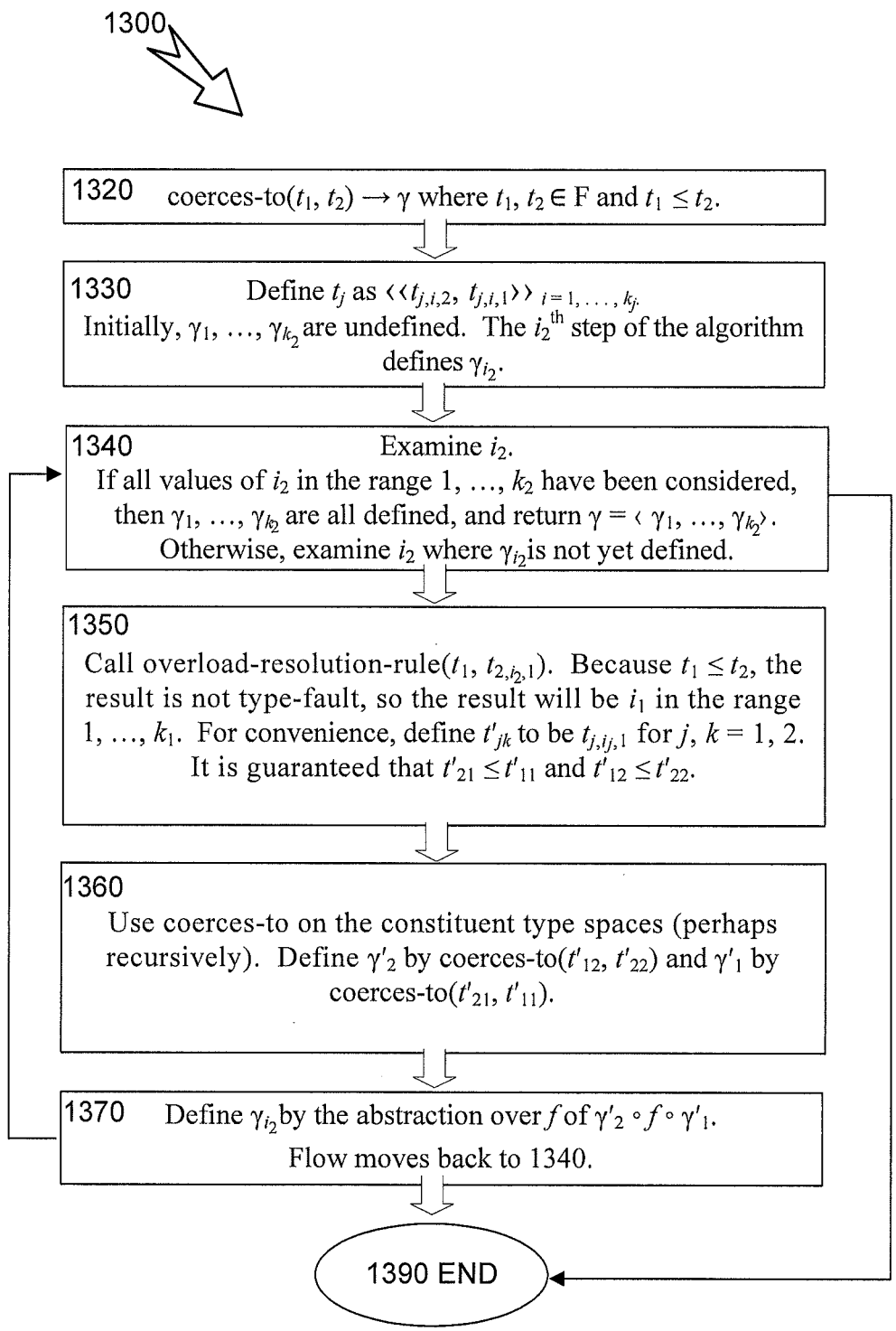
FIG. 13 illustrates an example flowchart describing the coercion of function values performed in a programming environment in an illustrative embodiment.

FIG. 13 illustrates an example flowchart 1300 describing the coercions 155 of function values performed in a programming environment in an illustrative embodiment. In block 1220, execution may begin by calling the coerces-to function. The coerces-to function may accept two parameters, $t_1$ and $t_2$, both are function representation types 150. The coerces-to function may return $\gamma$, representing a function, which when given a function $f_1$, represented as a list of overloads, and having a representation type 150 $t_1$, yields a function $f_2$, again represented as a list of overloads, and having a representation type 150 $t_1$. Thus $f_2$ is the coercion of $f_1$ to type $t_2$. The values $t_1$ and $t_2$ exist in F and $t_1 \le t_2$.

In block 1330, $t_j$ may be defined as $<<t_{j,i,2}, t_{j,i,1}>> i=1, \ldots, k_j$. Initially, $\gamma_1, \ldots, \gamma_{k_2}$ are undefined. The $i_2^{th}$ step of the algorithm defines $\gamma_{i_2}$.

In block 1340, the value $i_2$ may be examined. A check may be performed to determine whether all values of $i_2$ in the range $1, \ldots, k_2$ have been considered, if so, then $\gamma_1, \ldots, \gamma_{k_2}$ are all defined, and return $\gamma = <\gamma_1, \ldots, \gamma_{k_2}>$ and flow may move to 1390 and end. Otherwise, examine $i_2$ where $\gamma_{i_2}$ is not yet defined and flow may continue.

In block 1350, the overload-resolution-rule $(t_1, t_2, i_2, 1)$, as in FIG. 12, may be called. Because $t_1 \le t_2$, the result is not type-fault, so the result will be $i_1$ in the range $1, \ldots, k_1$. For convenience, define $t'_{jk}$ to be $t_{j,i_j,1}$ for $j, k=1, 2$. It is guaranteed that $t'_{21} \le t'_{11}$ and $t'_{12} \le t'_{22}$.

In block 1360, coerces-to may be used on the constituent type spaces (perhaps recursively). The value $\gamma'_2$ may be defined by coerces-to $(t'_{12}, t'_{22})$ and $\gamma'_1$ by coerces-to $(t'_{21}, t'_{11})$.

In block 1370, the value $\gamma_{i_2}$ may be defined by the abstraction over f of $\gamma'_2 \circ f \circ \gamma'_1$. Flow may move back to 1340.

Illustrative Embodiment Summary

One embodiment of the invention may include a type system with the following features:
  Representation types 150, viewed as elements of a quasi-ordering in which $t_1 \le t_2$ may mean that a value of type $t_1$ is implicitly coercible 155 to a value of type $t_2$.
  Correctness types 160, viewed as elements of a partial-ordering that may be isomorphic to the set of equivalence classes of representation types 150, where the equivalence relation is defined by $t_1 \approx t_2$ if and only if $t_1 \le t_2$ and $t_2 \le t_1$.

Another embodiment may include the above with the following features:
  The partial ordering on correctness types 160 may be a semi-lattice ordering. The greatest lower bound operator is denoted by $\sqcap$.
  The partial ordering may have a bottom element denoted by $\bot$.
  Given correctness types 160 $T_1 \ne \bot$ and $T_2$, there is a type representing a set of functions with argument correctness type 160 $T_1$ and result correctness type 160 $T_2$. This type may be denoted as $T_2 \leftarrow T_1$.
  Given correctness types 160 $T_{i1} \ne \bot$ and $T_{i2}$, for i=1 and 2, the $\sqcap$ and $\leftarrow$ operators may be related by the following equation, which holds whenever $T_{11} \sqcap T_{21} \ne \bot$:

$(T_{12} \leftarrow T_{11}) \sqcap (T_{22} \leftarrow T_{21}) = (T_{12} \leftarrow T_{11}) \sqcap (T_{22} \leftarrow T_{21})$
  $\sqcap ((T_{12} \sqcap T_{22}) \leftarrow (T_{11} \sqcap T_{21}))$ The canonical form for a correctness type 160 may be a set p of pairs of types, subject to these constraints:
    The second component of a pair is not $\bot$. As such, a pair $<T_2, T_1>$ as representing a function type $T_2 \leftarrow T_1$.
    If $<T_{i2}, T_{i1}>$ are elements of p, for i=1 and 2, and if $T_{11} \sqcap T_{21} \ne \bot$, then there exists $<T_2, T_1> \in p$ such that:

$T_{11} \sqcap T_{21} \sqsubseteq T_1$ and $T_2 \sqsubseteq T_{12} \sqcap T_{22}$ Another embodiment may include the above with the following features:
  Functions may be overloaded, where the argument and result representation types 150 of the set of overloads may be subject to the constraints as described in the third illustrative embodiment section.
  Function representation types 150 may be lists of pairs of representation types 150, subject to these same constraints.

Another embodiment may include the above with the following features:
  The resolution algorithm as described above may be given a representation type 150 t and a function representation type 150 p. The result of the algorithm may be either the indication that t is not matched by any element of p or an index saying which element of p is the best match for t.
  The resolution algorithm may be used in the overload resolution algorithm and in the algorithm for coercing one function type to another.

Example Software Implementation

FIGS. 14A, 14B, 14C, and 14D illustrate example software class definitions that may be configured to practice an illustrative embodiment of the invention.

OrderedSetWithBottom class 1405 may be a base class with a definition common to a partially ordered set and a quasi ordered set.

QuasiOrderedSet class 1410 may subclass OrderedSetWithBottom class 1405 and may implement a quasi-ordered set.

PartiallyOrderedSet class 1415 may subclass OrderedSetWithBottom class 1405 and may implement a partially ordered set.

Semilattice class 1420 may subclass PartiallyOrderedSet class 1415 and may implement a semilattice. Semilattice class 1420 may have only one class definition, that of a parameterized class Semilattice. Concrete subclasses of the Semilattice class 1420 (an example may be seen in class 1430) may need to define the glb (corresponds to $\sqcap$) and is_bottom methods, for example.

RepresentationTypeSpace class 1425 may be a subclass of QuasiOrderedSet class 1410 and may implement a representation type 150. Concrete subclasses of the RepresentationTypeSpace class 1425 (an example may be seen in 1460) may need to define gamma (corresponds to $\gamma$).

CorrectnessTypeSpace class 1430 may subclass RepresentationTypeSpace class 1425 and Semilattice class 1420. CorrectnessTypeSpace class 1430 may implement correctness types 160. The tau method of this class represents the connection $\tau$ between representation and correctness types 160.

ResultArgumentPair class 1435 may be a generic class for pairs typed by result and argument classes.

RepresentationParameterFunction class 1440 may provide a generic means of defining a class for lists of pairs associated with arguments and results. Two examples of its use, with different template parameters, may be seen in class 1460.

BottomFunction class 1445 defines the bottom of a quasi-ordered set for functions.

OrderedSetWithBottomFunction class 1450 may subclass OrderedSetWithBottom class 1405. OrderedSetWithBottomFunction class 1450 may define "le" for the quasi-ordered set of function representation types 150. In an illustrative embodiment, OrderedSetWithBottomFunction class 1450, may be used to implement the $\sqsubseteq$ function as illustrated in FIG. 10.

QuasiOrderedSetFunction class 1455 may subclass QuasiOrderedSet class 1310 and OrderedSetWithBottomFunction class 1450. QuasiOrderedSetFunction class 1455 may enhance the definition of the quasi-ordered set of function representation types 150 by defining equality.

RepresentationTypeSpaceFunction class 1460 may subclass RepresentationTypeSpace class 1425. RepresentationTypeSpaceFunction class 1460 may define gamma (coercion) for function representation types 150.

CorrectnessParameterFunction class 1465 may provide a generic means of defining a class for sets of pairs associated with arguments and results. Two examples of its use, with different template parameters, are in class 1475.

SemilatticeFunction class 1470 may subclass Semilattice class 1420. In an illustrative embodiment, software code, SemilatticeFunction class 1470, may be used to implement the ⊓ function as illustrated in FIG. 9.

CorrectnessTypeSpaceFunction class 1475 may subclass CorrectnessTypeSpace class 1430, RepresentationTypeSpaceFunction class 1460, and SemilatticeFunction class 1470. CorrectnessTypeSpaceFunction class 1475 may define τ.

The CorrectnessParameterFunction class 1465 may be parameterized by the class of the argument type and class of a function type. The CorrectnessParameterFunction class 1465, may be a list of pairs, which represents the set of pairs discussed above. Other embodiments may include other representations of sets of pairs.

The CorrectnessTypeSpaceFunction class 1475 constructor may take two CorrectnessTypeSpace objects, corresponding to arguments and results. These objects become fields of the resulting CorrectnessTypeSpaceFunction object (note that CorrectnessTypeSpaceFunction may be derived from CorrectnessTypeSpace). This type may be also the type defined by CorrectnessTypeSpaceFunction, and this type may be obtained by CorrectnessTypeSpaceFunction<...>.T. This type may be the argument/result type of the meet method and the argument type of the is_bottom method. Note that these methods are only declared, not defined.

Class definitions 1405-1475 represent example software code. Class definitions 1405-1475 (i.e., example software code) may be stored in tangible non-transitory computer readable storage media.

Other embodiments may include additional classes. In other embodiments, classes may be combined as needed. Class definitions 1405-1475 are written in the C++ programming language, but similar implementations may be written in other types of programming languages such as, but not limited to, the MATLAB® language, C, Fortran, Forth, ADA, Pascal, JavaScript, Python, C#, Java, Visual Basic, the Mathlab language, etc.

Example Distributed System

Figure 15:
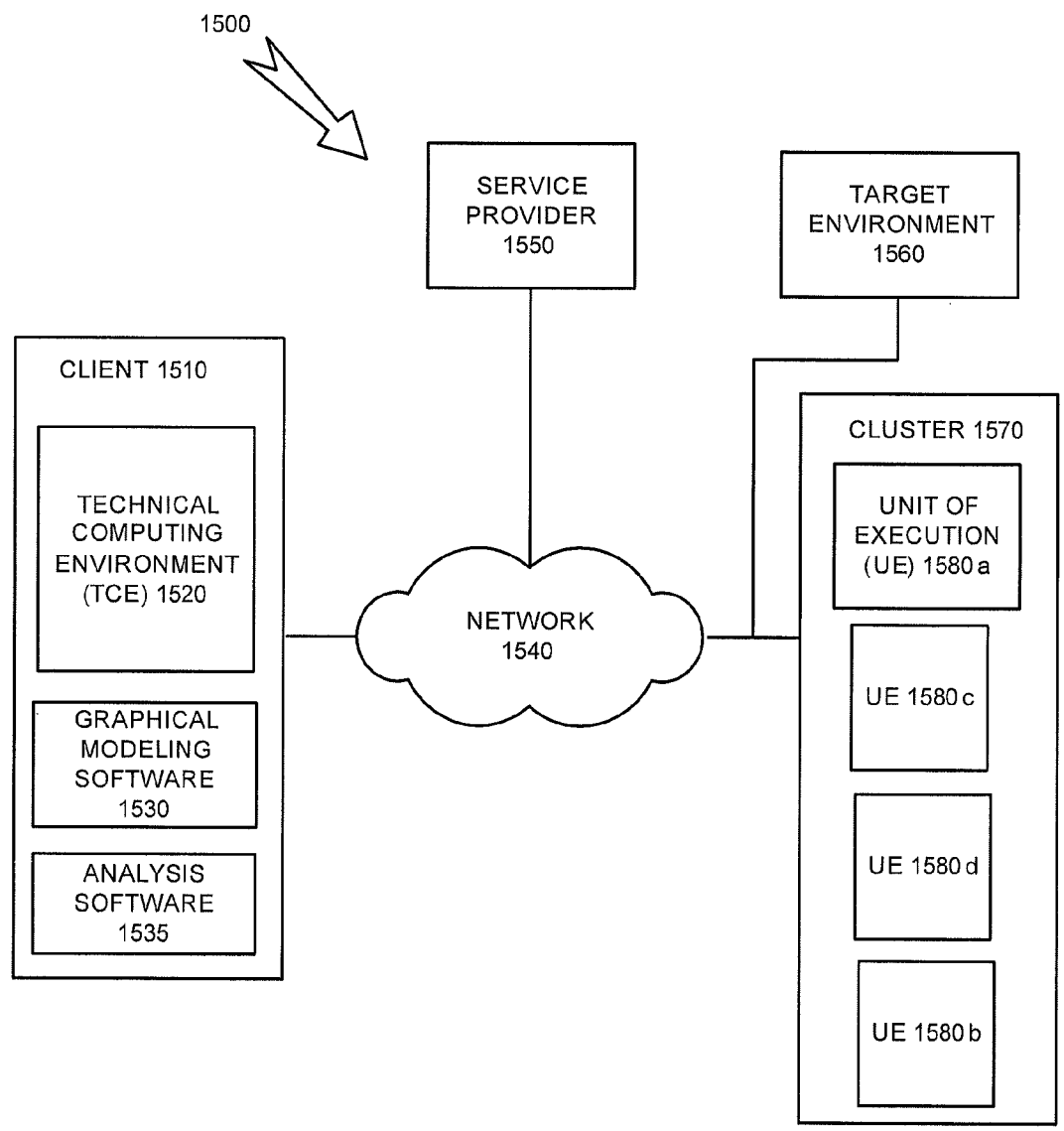
FIG. 15 illustrates an example distributed environment that may be configured to practice an illustrative embodiment.

FIG. 15 illustrates a distributed environment 1500 that may be configured to practice an illustrative embodiment. Referring to FIG. 15, environment 1500 may include a client 1510, network 1540, service provider 1550, target environment 1560 and cluster 1570. Note that the distributed environment illustrated in FIG. 15 is just one example of a distributed environment that may be used. Other distributed environments may include additional devices, fewer devices, or devices in arrangements that differ from the arrangement of environment 1500. For example, distributed environment 1500 can be implemented as a computing cloud if desired.

Client 1510 may include a device capable of sending and/or receiving information (e.g., data) to and/or from another device, such as target environment 1560. Information may include any type of machine-readable information having substantially any format that may be adapted for use, e.g., in one or more networks and/or with one or more devices. The information may include digital information and/or analog information. The information may further be packetized and/or non-packetized. In an embodiment, client 1510 may download data and/or code via network 1540. For example, client 1510 can download code for a wide-spectrum type system 110 consistent with aspects of the invention.

Client 1510, service provider 1550, and/or target environment 1560 may implement programming environment 100.

Client 1510 may be, for example, a desktop computer, a laptop computer, a client computer, a server computer, a mainframe computer, a personal digital assistant (PDA), a web-enabled cellular telephone, a smart phone, smart sensor/actuator, or another computation or communication device that executes instructions that enable the device to perform one or more activities and/or generate one or more results.

In an embodiment, client 1510 may include a technical computing environment (TCE) 1520, graphical modeling software 1530 and analysis software 1535. In other embodiments, client 1510 may include other components, applications, etc. Embodiments of TCE 1520 may contain computer-executable instructions (e.g., code) and data that are configured to implement the TCE. The instructions may include instructions configured to implement modeling software 1520 and/or graphical analysis software 1535. An example embodiment of the current invention may be implemented in a TCE 1510. An example embodiment of one or more of function semilattices 130, correctness types 160, representation types 150, function overload resolution 180, function coercion 170, and/or a wide-spectrum type system 110 provided by programming environment 100 may be implemented in a TCE 1520.

Modeling software 1530 and the analysis software 1535 may be graphical, textual or a hybrid that includes both textual and graphical capabilities/features. Modeling software 1530 may include computer-executable instructions that allow, e.g., a user to build and/or execute a model. For example, modeling software 1530 may allow a user to build and execute a time-based model, a state-based model, an event-based model, a dataflow-based model, etc. An example embodiment of the current invention may be implemented as part of modeling software 1530.

Analysis software 1535 may include computer-executable instructions that allow information in a model to be evaluated. Evaluating a model may include generating tests for the model that satisfy model coverage objectives, user-defined objectives, etc. In addition, evaluating a model may include proving various model properties and generating examples of violations of these properties. Moreover, evaluating a model may include analyzing the model, in accordance with techniques described herein. In an illustrative embodiment, analysis software 1535 may include the Simulink® Design Verifier software which is available from MathWorks, Inc. An example embodiment of the current invention may be implemented as part of analysis software 1535.

Network 1540 may include any network capable of exchanging information between entities associated with the network, including, for example, client 1510, service provider 1550, target environment 1560 and cluster 1570. Exchanged information may include, for example, packet data and/or non-packet data. Implementations of network 1540 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

Network 1540 may include various network devices, such as, for example, routers, switches, firewalls, servers, etc. Portions of network 1540 may be wired (e.g., using wired conductors, optical fibers, etc.) and/or wireless (e.g., free-space optical (FSO), radio frequency (RF), acoustic transmission paths, etc.). Portions of network 1540 may include a substantially open public network, such as the Internet. Portions of network 1540 may include a more restricted network, such as a virtual private network (VPN). It should be noted that implementations of networks and/or devices operating on networks described herein are not limited with regards to information carried by the networks, protocols used in the networks, the architecture/configuration of the networks, etc.

Service provider 1550 may include code (e.g., software), logic (e.g., hardware or a combination of hardware and software), etc., that makes a service available to another device in distributed environment 1500. Service provider 1550 may include a server operated by an entity (e.g., an individual, a corporation, an educational institution, a government agency, etc.) that provides one or more services to a destination, such as client 1510. The services may include software containing computer-executable instructions that may be executed, in whole or in part, by a destination, by service provider 1550 on behalf of the destination, or some combination thereof. An example embodiment of the current invention may be implemented as part of service provider 1550.

For example, in an embodiment, service provider 1550 may provide one or more subscription-based services to various customers via network 1540. These services may be accessed by the customer (e.g., via client 1510). Service provider 1550 may limit access to certain services based on, e.g., a customer service agreement between the customer and service provider 1550. The service agreement may allow the customer to access services that allow the customer to build and/or execute a model. In addition, the service agreement may allow the customer to further analyze models, generate code from the models, generate various reports, access audit services that allow a customer's code to be audited, etc. The service agreement may include other types of arrangements, such as certain fee-based arrangements or restricted access arrangements. For example, a customer may pay a fee which provides the customer unlimited access to a given package of services for a given time period (e.g., hourly, daily, monthly, yearly, etc.). For services not included in the package, the customer may have to pay an additional fee in order to access the services. Still other arrangements may be resource-usage based. For example, the customer may be assessed a fee based on an amount of computing resources used, network bandwidth used, etc.

Target environment 1560 may include a device that receives information from client 1510, service provider 1550, or cluster 1570. For example, target environment 1560 may receive executable code from client 1510, where the executable code allows target environment to perform an operation when the code is executed. Client 1510 may have generated the executable code using TCE 1520, graphical modeling software 1530, and/or a code generator (not shown in FIG. 15).

Cluster 1570 may include a number of processing resources that perform processing on behalf of another device, such as client 1510, service provider 1550 and/or target environment 1560. Cluster 1570 may include logic that manages and/or coordinates the operation of multiple processing resources. For example, cluster 1570 may send data to and/or receive results from these processing resources. In an embodiment, cluster 1570 may include units of execution (UEs) 1580$a$, $b$, $c$, and $d$ (collectively UEs 1580) that may perform processing on behalf of client 1510 and/or another device, such as service provider 1550. An example embodiment of the current invention may be implemented on one or more UEs 1580.

UEs 1580 may include hardware, software, or hybrid logic that performs processing operations on behalf of TCE 1520. For example, in an embodiment UEs 1580 may parallel process portions of a graphical model created by user of client 1510. This parallel processing may include performing analysis on the model, parsing the model into portions, and/or aggregating results from respective UEs 1580 into a single result for display to a user at client 1510. UEs 1580 may reside on a single device or chip or on multiple devices or chips. For example, UEs 1580 may be implemented in a single application specific integrated circuit (ASIC) or in multiple ASICs. Likewise, UEs 1580 can be implemented in a single computer system using virtualization techniques. Other examples of UEs 1580 may include field programmable gate arrays (FPGAs), complex programmable logic devices (CPLDs), application specific instruction-set processors (ASIPs), microprocessors, etc.

Illustrative Computing Architecture Example System

Figure 16:
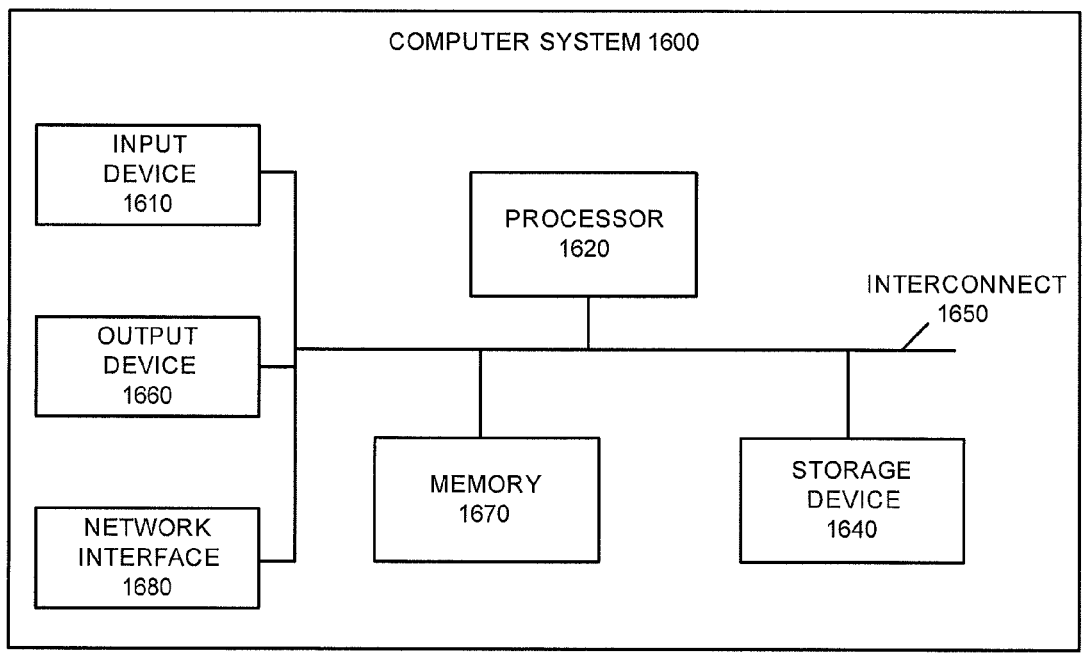
FIG. 16 illustrates an example of a computer system that may be configured to practice an illustrative embodiment of the invention.

FIG. 16 illustrates an example of a computer system 1600 that may be configured to practice an embodiment of the invention. For example, computer system 1600 may be used to implement client 1510, service provider 1550, target environment 1560, programming environment 100, etc. Computer system 1600 may include processor 1620, memory 1670, storage device 1640, input device 1610, output device 1660, and network interface 1680. Processor 1620 may include logic configured to execute computer-executable instructions that implement embodiments of the invention. An example of a processor that may be used with the invention includes the Pentium® processor, Core i7® processor, or Xeon® processor all available from Intel Corporation, Santa, Clara, Calif. The instructions may reside in memory 1670 and may include instructions associated with TCE 1520.

Memory 1670 may be a computer-readable medium that may be configured to store instructions configured to implement embodiments of the invention. Memory 1670 may be a primary storage accessible to processor 1620 and can include a random-access memory (RAM) that may include RAM devices, such as, for example, Dynamic RAM (DRAM) devices, flash memory devices, Static RAM (SRAM) devices, etc. Storage device 1640 may include a magnetic disk and/or optical disk and its corresponding drive for storing information and/or instructions. Memory 1670 and/or storage device 1640 may store class definitions 1405-1475.

Interconnect 1650 may include logic that operatively couples components of computer system 1600 together. For example, interconnect 1650 may allow components to communicate with each other, may provide power to components of computer system 1600, etc. In an embodiment of computer system 1600, interconnect 1650 may be implemented as a bus.

Input device 1610 may include logic configured to receive information for computer system 1600 from, e.g., a user. Embodiments of input device 1610 may include keyboards, touch sensitive displays, biometric sensing devices, computer mice, trackballs, pen-based point devices, etc. Output device 1660 may include logic configured to output information from computer system. Embodiments of output device 1660 may include cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc.

Network interface 1680 may include logic configured to interface computer system 1600 with a network, e.g., network 1540, and may enable computer system 1600 to exchange information with other entities connected to the network, such as, for example, service provider 1550, target environment 1560 and cluster 1570. Network interface 1680 may be implemented as a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing computer system 1600 to any type of network.

It should be noted that embodiments may be implemented using some combination of hardware and/or software. It should be further noted that a computer-readable medium that includes computer-executable instructions for execution in a processor may be configured to store embodiments of the invention. The computer-readable medium may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data on e.g., a communication network for an embodiment of the invention.

A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processors 1620. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a technical computing environment [e.g., MATLAB® software], a worker, a lab, etc.) that performs and/or participates in parallel programming activities. For example, a software unit of execution may perform and/or participate in parallel programming activities in response to receipt of a program and/or one or more portions of the program. In an embodiment, a software unit of execution may perform and/or participate in substantially any type of parallel programming using one or more hardware units of execution. Embodiments of a software unit of execution may support one or more threads and/or processes when performing processing operations.

A TCE 1520 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. Example software code 1400 may be complied and processed by processor 1620 and implemented in TCE 1520.

In one implementation, the TCE 1520 may include a dynamically typed language that can be used to express problems and/or solutions in mathematical notations familiar to those of skill in the relevant arts. For example, the TCE 1520 may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

A TCE 1520 may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

A TCE 1520 may further provide mathematical functions and/or graphical tools (e.g., for creating plots, surfaces, images, volumetric representations, etc.). In one implementation, the TCE 1520 may provide these functions and/or tools using toolboxes (e.g., toolboxes for signal processing, image processing, data plotting, parallel processing, optimization, etc.). In another implementation, the TCE 1520 may provide these functions as block sets (e.g., an optimization block set). In still another implementation, the TCE 1520 may provide these functions in another way, such as via a library, etc. The TCE 1520 may be implemented as a text based environment, a graphically based environment, or another type of environment, such as a hybrid environment that is both text and graphically based.

Alternative Embodiments

An alternative embodiment may implement a TCE 1520 using one or more text-based products. For example, a text-based TCE 1520, may be implemented using products such as, but not limited to, MATLAB® by MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Other embodiments may implement a TCE 1520 in a graphically-based TCE 1520 using products such as, but not limited to, Simulink®, Stateflow®, SimEvents™, etc., by MathWorks, Inc.; VisSim by Visual Solutions; LabView® by National Instruments; Dymola by Dynasim; SoftWIRE by Measurement Computing; WiT by DALSA Coreco; VEE Pro or System Vue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

Another alternative embodiment may be implemented in a language that is compatible with a product that includes a TCE 1520, such as one or more of the above identified text-based or graphically-based TCE's 1520. For example, MAT- LAB® (a text-based TCE 1520) may use a first command to represent an array of data and a second command to transpose the array. Another product, that may or may not include a TCE 1520, may be MATLAB®-compatible and may be able to use the array command, the array transpose command, or other MATLAB® commands. For example, the other product may use the MATLAB® commands to suggest proper identifiers when an unknown identifier is presented.

Yet another alternative embodiment may be implemented in a hybrid TCE 1520 that combines features of a text-based and graphically-based TCE 1520. In one implementation, one TCE 1520 may operate on top of the other TCE 1520. For example, a text-based TCE 1520 (e.g., MATLAB®) may operate as a foundation and a graphically-based TCE 1520 (e.g., Simulink) may operate on top of MATLAB® and may take advantage of text-based features (e.g., commands) to provide a user with a graphical user interface and graphical outputs (e.g., graphical displays for data, dashboards, etc.).

CONCLUSION

Implementations may provide devices and techniques that implement a wide-spectrum type system, suitable for a programming language that offers both statically and dynamically typed aspects. An implementation may include representation types 150 and correctness types 160 as described herein. Another implementation may include function overload resolution 180.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 6-10 and 12-13 the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 15 and 16, depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and/or subheadings used herein are used to segment this patent application into portions to facilitate the readability of the application. These headings and/or subheadings are not intended to define or limit the scope of the invention disclosed and/or claimed in this patent application.

The scope of the invention is defined by the claims and their equivalents.

What is claimed is:

1. One or more tangible non-transitory computer-readable storage media for storing computer-executable instructions executable by processing logic, the media storing one or more instructions for:
   determining a first set of representation types and a second set of representation types in a programming environment, the determining performed by a computer;
   determining a first quasi-ordering of the first set of representation types and a second quasi-ordering of the second set of representation types in the programming environment by the computer;
   determining a first coercion function in the programming environment by the computer, such that the first set of representation types, the first quasi-ordering, and the first coercion function constitute a first representation type space;
   determining a second coercion function in the programming environment by the computer, such that the second set of representation types, the second quasi-ordering, and the second coercion function constitute a second representation type space;
   determining, a set of function representation types using the first representation type space and the second representation type space, where elements r in the set of function representation types comprise a sequence of pairs $<<r_{i2}, r_{i1}>>_i=1, \ldots, k$, each $r_{i1}$ being an element of the first representation type space and each $r_{i2}$ being an element of the second representation type space, for $i=1, \ldots, k$, and r passing an admissible function representation type test;
   determining, given a sequence of overloads $f_1, \ldots, f_k$, whether $f_1, \ldots, f_k$, is admissible, using a result representation type $R_{i2}$ of $f_i$ and a result representation type $R_{i1}$ of $f_i$, that the sequence of pairs $<<r_{i2}, r_{i1}>>_i=1, \ldots, k$, be an admissible function representation type;
   selecting, given an admissible sequence of overloads $f_1, \ldots, f_k$ and an argument x to which the overloads are to be applied, which of the $f_i$ to invoke on x, where selecting includes a determination by an overload resolution rule applied to a type of x and the sequence of pairs $<<r_{i2}, r_{i1}>>_i=1, \ldots, k$;
   determining a correctness type space over the first representation type space in the programming environment by the computer; and
   storing the correctness type space in memory by the computer.

2. One or more tangible non-transitory computer-readable storage media for storing computer-executable instructions executable by processing logic, the media storing one or more instructions for:
   defining representation type spaces $R_1$ and $R_2$ in a programming environment by a computer;
   defining, in the programming environment by the computer, correctness type spaces $C_1$ and $C_2$ over the representation type spaces $R_1$ and $R_2$, respectively;
   defining in the programming environment by the computer:
   a representation type space R, and
   a correctness type space C over the representation type space R, the defining performed such that a semilattice associated with the correctness type space C is a function semilattice over respective semilattices associated with correctness type spaces $C_1$ and $C_2$;

determining, using representation type spaces $R_1$ and $R_2$, a set of function representation types F, each element r in F being a sequence of pairs $<<r_{i2}, r_{i1}>>_i=1, \ldots, k$, each $r_{ij}$ being an element of $R_j$ for $i=1, \ldots, k$ and $j=1$ or 2, and r passing an admissible function representation type test;

determining, given a sequence of overloads $f_1, \ldots, f_k$, whether $f_1, \ldots, f_k$ is admissible, using a result representation type $R_{i2}$ of $f_i$ and a result representation type $R_{i1}$ of $f_i$, that the sequence of pairs $<<r_{i2}, r_{i1}>>_i=1, \ldots, k$ be an admissible function representation type; and selecting, given an admissible sequence of overloads $f_1, \ldots, f_k$ and an argument x to which the overloads are to be applied, which of the $f_i$ to invoke on x, where selecting includes a determination by an overload resolution rule applied to a type of x and the sequence of pairs $<<r_{i2}, r_{i1}>>_i=1, \ldots, k$.

3. The one or more tangible non-transitory computer-readable storage media of claim 2, wherein the admissible function representation type test comprises instructions for:

accepting an r' as input, where $r'=<<r'_{i2}, r'_{i1}>>_i=1, \ldots, k$, each $r'_{ij}$ being an element of $R_j$ for $i=1, \ldots, k$ and $j=1$ or 2;

determining argument representation type distinctness as equivalent to a condition that for all $i_1$ and $i_2$ in a range from 1 to k, if $i_1 \neq i_2$, then $r'_{i_1,1} \neq r'_{i_2,1}$;

determining argument type correctness as equivalent to a second condition that for all $i_1$ and $i_2$ in the range from 1 to k, if $r'_{i_1,1}=r'_{i_2,1}$, then $r'_{i_1,2}=r'_{i_2,2}$;

determining no missing overloads correctness as equivalent to a third condition that for all $i_1$ and $i_2$ in the range from 1 to k, if $r'_{i_1,1}, r'_{i_2,1}$ are unordered and $r'_{i_1,1} \sqcap r'_{i_2,1} \neq \bot$, then there exists i such that $r'_{i_1,1} \sqcap r'_{i_2,1} \sqsubseteq r'_{i,1}$ and $r'_{i,2} \sqsubseteq r'_{i_1,2} \sqcap r'_{i_2,2}$; and determining consistent coerceability as equivalent to a fourth condition that for all $i_1$ and $i_2$ in the range from 1 to k, if $r'_{i_1,1} \sqsubseteq r'_{i_2,1}$, then $r'_{i_1,2} \sqsubseteq r'_{i_2,2}$.

4. The one or more tangible non-transitory computer-readable storage media of claim 2, wherein the overload resolution rule comprises:

calculating, given a representation type $r_0$ and an admissible function representation type $r'=<<r_{i2}, r_{i1}>>_i=1, \ldots, k$, a correctness type $c_0$ corresponding to $r_0$ and a function correctness type c' corresponding to r', where c' is represented by a set of pairs of correctness types $\{<c_{j2}, c_{j1}>\}_j=1, \ldots, l$ being in function semilattice canonical form;

calculating, from $c_0$ and c', a subset E of c', E including pairs $<c_{j2}, c_{j1}>$ of such that $c_0 \sqsubseteq <c_{j2}, c_{j1}>$;

returning when E is empty a value indicating that overload resolution cannot select an appropriate index;

calculating a set of correctness types $Results_1$ including all $c_{j2}$ where $<c_{j2}, c_{j1}>$ is an element of E, calculating $Results_2$ as minimal elements of $Results_1$, and $Results_2$ has a single element $c_{result}$;

calculating $Arguments_1$ to be a set of all $c_{j1}$ where $<c_{result}, c_{j1}>$ is an element of E, calculating $Arguments_2$ as minimal elements of $Arguments_1$, and $Arguments_2$ has a single element $c_{argument}$; and yielding i satisfying a property that $r_{i2}$ corresponds to $c_{result}$ and $r_{i1}$ corresponds to $c_{argument}$.

5. The one or more tangible non-transitory computer-readable storage media of claim 2, further comprising instructions for:

constructing, given admissible function representation types $r_1$ and $r_2$, such that $r_1 \leq r_2$, a coercion function from functions of type $r_1$ to functions of type $r_2$, using a function coercion algorithm.

6. The one or more tangible non-transitory computer-readable storage media of claim 5, wherein the function coercion algorithm comprises:

calculating, given for h=1 and 2 admissible function representation types $r_h=<<r_{hi2}, r_{hi1}>>_i=1, \ldots, k_h$, such that $r_1 \leq r_2$, for each $i_2$ in values from 1 to $k_2$, inclusive, a value given by an overload resolution algorithm applied to $r_{2,i_2}$ and $r_1$, a second value denoted by $ora(i_2)$, such that $r_{1,ora(i_2),2} \leq r_{2,i_2,2}$ and $r_{2,i_2,1} \leq_1 r_{i,ora(i_2),1}$;

calculating, for each $i_2$ in the values from 1 to $k_2$, inclusive, a coercion function $\gamma_{2,i_2}$ from $r_{1,ora(i_2),2}$ to $r_{2,i_2,2}$ and a coercion function $\gamma_{1,di\ 2}$ from $r_{2,i_2,1}$ to $r_{1,ora(i_2),1}$; and determining a function $\gamma_{r_2,r_1}$ defined by a rule that for function f with representation type $r_1$, equation $\gamma_{r_2,r_1}(f)=<<\gamma_{2i} \circ f_{ora(i)} \circ \gamma_{1i}>>_i=1, \ldots, k_2$ holds.

7. One or more tangible non-transitory computer-readable storage media for storing computer-executable instructions executable by processing logic, the media storing one or more instructions for:

downloading the instructions of claim 2 to a computer system, which when executed by the computer system causes the computer system to perform operations comprising the downloaded instructions.

8. One or more tangible non-transitory computer-readable storage media for storing computer-executable instructions executable by processing logic, the media storing one or more instructions for:

performing the instructions of claim 2 in a distributed environment.

9. A method comprising:

defining a first representation type space and second representation type space in a programming environment, the defining performed by a computer;

defining, in the programming environment by the computer, a first correctness type space over the first representation type space and a second correctness type space over the second representation type space;

defining, in the programming environment by the computer, a third representation type space and a third correctness type space over the third representation type space, such that a semilattice associated with the third correctness type space is a function semilattice over respective semilattices associated with the first correctness type space and the second correctness type space;

determining, in the programming environment by the computer, a set of function representation types using the first representation type space and the second representation type space, where elements r in the set of function representation types comprise a sequence of pairs $<<r_{i2}, r_{i1}>>_i=1, \ldots, k$, each $r_{i1}$ being an element of the first representation type space and each $r_{i2}$ being an element of the second representation type space, for $i=1, \ldots, k$, and r passing an admissible function representation type test, the admissible function representation type test includes:

accepting, in the programming environment by the computer, an r' as input, where $r'=<<r'_{i2}, r'_{i1}>>_i=1, \ldots, k$, each $r'_{i1}$ being an element of the first representation type space and each $r'_{i2}$ being an element of the second representation type space for $i=1, \ldots, k$;

determining, in the programming environment by the computer, argument representation type distinctness as equivalent to a condition that for all $i_1$ and $i_2$ in a range from 1 to k, if $i_1 \neq i_2$, then $r'_{i_1,1} \neq r'_{i_2,1}$;

determining, in the programming environment by the computer, argument type correctness as equivalent to a second condition that for all $i_1$ and $i_2$ in the range from 1 to k, if $r'_{i_1,1} = r'_{i_2,1}$, then $r'_{i_1,2} = r'_{i_2,2}$;

determining, in the programming environment by the computer, no missing overloads correctness as equivalent to a third condition that for all $i_1$ and $i_2$ in the range from 1 to k, if $r'_{i_1,1}$, $r'_{i_2,1}$ are unordered and $r'_{i_1,1} \sqcap r'_{i_2,1} \neq \perp$, then there exists i such that $r'_{i_1,1} \sqcap r'_{i_2,1} \sqsubseteq r'_{i,1}$ and $r'_{i,2} \sqsubseteq r'_{i_1,2} \sqcap r'_{i_2,2}$; and determining, in the programming environment by the computer, consistent coerceability as equivalent to a fourth condition that for all $i_1$ and $i_2$ in the range from 1 to k, if $r'_{i_1,1} \sqsubseteq r'_{i_2,1}$, then $r'_{i_1,2} \sqsubseteq r'_{i_2,2}$; and storing the set of function representation types in memory by the computer.

10. The method of claim 9, further comprising:

determining, given a sequence of overloads $f_1, \ldots, f_k$, whether $f_1, \ldots, f_k$ is admissible, using a result representation type $R_{i2}$ of $f_i$ and a result representation type $R_{i1}$ of $f_i$, that the sequence of pairs $<<r_{i2}, r_{i1}>>_i = 1, \ldots, k$ be an admissible function representation type; and selecting, given an admissible sequence of overloads $f_1, \ldots, f_k$ and an argument x to which the overloads are to be applied, which of the $f_i$ to invoke on x, where selecting includes a determination by an overload resolution rule applied to a type of x and the sequence of pairs $<<r_{i2}, r_{i1}>>_i = 1, \ldots, k$.

11. The method of claim 10, wherein the overload resolution rule comprises:

calculating, given a representation type $r_0$ and an admissible function representation type $r' = <<r_{i2}, r_{i1}>>_i = 1, \ldots, k$, a correctness type $c_0$ corresponding to $r_0$ and a function correctness type c' corresponding to r', where c' is represented by a set of pairs of correctness types $\{<c_{j2}, c_{j1}>\}_j = 1, \ldots, l$ being in function semilattice canonical form;

calculating, from $c_0$ and c', a subset E of c', E including pairs $<c_{j2}, c_{j1}>$ of such that $c_0 \sqsubseteq <c_{j2}, c_{j1}>$;

returning when E is empty a value indicating that overload resolution cannot select an appropriate index;

calculating a set of correctness types Results$_1$ including all $c_{j2}$ where $<c_{j2}, c_{j1}>$ is an element of E, calculating Results$_2$ as minimal elements of Results$_1$, and Results$_2$ has a single element $c_{result}$;

calculating Arguments$_1$ to be a set of all $c_{j1}$ where $<c_{result}, c_{j1}>$ is an element of E, calculating Arguments$_2$ as minimal elements of Arguments$_1$, and Arguments$_2$ has a single element $c_{argument}$; and yielding i satisfying a property that $r_{i2}$ corresponds to $c_{result}$ and $r_{i1}$ corresponds to $c_{argument}$.

12. The method of claim 9, further comprising:

constructing, given admissible function representation types $r_1$ and $r_2$, such that $r_1 \leq r_2$, a coercion function from functions of type $r_1$ to functions of type $r_2$, using a function coercion algorithm.

13. The method of claim 12, wherein the function coercion algorithm comprises:

calculating, given for h=1 and 2 admissible function representation types $r_h = <<r_{hi_2}, r_{hi_1}>>_i = 1, \ldots, k_h$, such that $r_1 \leq r_2$, for each $i_2$ in values from 1 to $k_2$, inclusive, a value given by an overload resolution algorithm applied to $r_{2,i_2,1}$ and $r_1$, a second value denoted by ora($i_2$), such that $r_{1,ora(i_2),2} \leq_2 r_{2,i_2,2}$ and $r_{2,i_2,1} \leq_1 r_{1,ora(i_2),1}$;

calculating, for each $i_2$ in the values from 1 to $k_2$, inclusive, a coercion function $\gamma_{2,i_2}$ from $r_{1,ora(i_2),2}$ to $r_{2,i_2,2}$ and a coercion function $\gamma_{1,i_2}$ from $r_{2,i_2,1}$ to $r_{1,ora(i_2),1}$; and determining a function $\gamma_{r_2,r_1}$ defined by a rule that for function f with representation type $r_1$, equation $\gamma_{r_2,r_1}(f) = <<\gamma_{2i} \circ f_{ora(i)} \circ \gamma_{1i}>>_i = 1, \ldots, k_2$ holds.

14. A computing device comprising one or more processors to execute a computer programming environment, the computer programming environment including executable instructions to:

define representation type spaces $R_1$ and $R_2$ in the computer programming environment;

define, in the computer programming environment, correctness type spaces $C_1$ and $C_2$ over the representation type spaces $R_1$ and $R_2$, respectively;

define, in the computer programming environment, a representation type space R and a correctness type space C over the representation type space R, such that a semilattice associated with the correctness type space C is a function semilattice over respective semilattices associated with correctness type spaces $C_1$ and $C_2$;

determine, using representation type spaces $R_1$ and $R_2$, a set of function representation types F, each element r in F being a sequence of pairs $<<r_{i2}, r_{i1}>>_i = 1, \ldots, k$, each $r_{ij}$ being an element of $R_j$ for i=1, \ldots, k and j=1 or 2, and r passing an admissible function representation type test;

determine, given a sequence of overloads $<<r_{i2}, r_{i1}>>_i = 1, \ldots, k$, whether $f_1, \ldots, f_k$, is admissible, using a result representation type $R_{i2}$ of $f_i$ and a result representation type $R_{i1}$ of $f_i$, that the sequence of pairs $<<r_{i2}, r_{i1}>>_i = 1, \ldots, k$ be an admissible function representation type; and select, given an admissible sequence of overloads $f_1, \ldots, f_k$ and an argument x to which the overloads are to be applied, which of the $f_i$ to invoke on x, where selecting includes a determination by an overload resolution rule applied to a type of x and the sequence of pairs $<<r_{i2}, r_{i1}>>_i = 1, \ldots, k$.

* * * * *

UNITED STATES PATENT AND TRADEMARK OFFICE
CERTIFICATE OF CORRECTION

PATENT NO.        : 9,104,428 B1                                    Page 1 of 1
APPLICATION NO.   : 14/092128
DATED             : August 11, 2015
INVENTOR(S)       : Michael Karr It is certified that error appears in the above-identified patent and that said Letters Patent is hereby corrected as shown below:

In the Claims:

In claim 6, at column 28, in line 9, " $2r_{2,i_2^2}$ " should be -- $2r_{2,i_2,2}$ --.

In claim 6, at column 28, in line 12, " $\gamma_{1,d'_2}$ " should be -- $\gamma_{1,i'_2}$ --.

In claim 9, at column 29, in line 8, " $r'_{i2} \subseteq r'_{i_1,2} \cap r'_{i,2}$ " should be -- $r'_{i2} \subseteq r'_{i_1,2} \cap r'_{i_2,2}$ --.

In claim 11, at column 29, in line 36, " $c_{j1}\}_{j=1,\ldots,l}$ " should be -- $c_{j1}\}_{j=1,\ldots,l}$ --.

In claim 14, at column 30, in lines 40-41, " $\langle\langle r_{i2}, r_{i1}\rangle\rangle_{i=1,\ldots,k}$ " should be -- $f_1, \ldots, f_k$ --.

Signed and Sealed this
Twenty-third Day of August, 2016

Michelle K. Lee
*Director of the United States Patent and Trademark Office*